United States Patent
Ushiyama et al.

(10) Patent No.: US 7,886,037 B2
(45) Date of Patent: Feb. 8, 2011

(54) INFORMATION DISTRIBUTION SYSTEM, REGISTRATION APPARATUS, INFORMATION PROCESSING APPARATUS, RECORDING MEDIUM HAVING REGISTRATION PROGRAM MEMORIZED IN IT, AND STORAGE MEDIUM HAVING INFORMATION PROCESSING PROGRAM MEMORIZED IN IT

(75) Inventors: Kentaro Ushiyama, Nagoya (JP); Yuji Kiyohara, Nagoya (JP); Hiroaki Suzuki, Nagoya (JP); Koichi Iijima, Tokyo (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 472 days.

(21) Appl. No.: 11/987,782

(22) Filed: Dec. 4, 2007

(65) Prior Publication Data

US 2008/0147778 A1 Jun. 19, 2008

Related U.S. Application Data

(63) Continuation-in-part of application No. PCT/JP2006/310423, filed on May 25, 2006.

(30) Foreign Application Priority Data

Jul. 26, 2005 (JP) .............................. 2005-216248

(51) Int. Cl.
G06F 15/173 (2006.01)

(52) U.S. Cl. ...................................... 709/223

(58) Field of Classification Search ................. 709/202, 709/223
See application file for complete search history.

(56) References Cited

U.S. PATENT DOCUMENTS 6,484,204 B1 * 11/2002 Rabinovich ................. 709/226

(Continued)

FOREIGN PATENT DOCUMENTS

JP A 2003-216521 7/2001

(Continued)

OTHER PUBLICATIONS

Oka et al., "Lightweight Load Balancing for Distributed Hash Tables", *The Institute of Electronics, Information and Communication Engineers*, Technical Report of IEICE, Feb. 2004.

(Continued)

*Primary Examiner*—Ario Etienne
*Assistant Examiner*—Hee Soo Kim
(74) *Attorney, Agent, or Firm*—Oliff & Berridge PLC

(57) ABSTRACT

An information delivery system or the like which autonomously distribute and arrange contents as many as a number necessary inside the delivery system at appropriate positions inside the delivery system without providing a server or the like which administrates ubiety and number of the contents.

There is provided an information delivery system having a plurality of information processing apparatuses which can mutually communicate through a network and a registration apparatus which holds at least one or more common information pieces so as to be used in common with the plurality of information processing apparatuses.

13 Claims, 16 Drawing Sheets

U.S. PATENT DOCUMENTS

| | | |
|---|---|---|
| 2004/0073602 A1 | 4/2004 | Higuchi |
| 2008/0270421 A1 | 10/2008 | Ushiyama |
| 2009/0169021 A1 | 7/2009 | Ushiyama |

FOREIGN PATENT DOCUMENTS

| | | |
|---|---|---|
| JP | A-2002-300145 | 10/2002 |
| JP | A 2003-099337 | 4/2003 |
| JP | A 2003-099354 | 4/2003 |
| JP | A 2003-316678 | 11/2003 |
| JP | A-2004-078813 | 3/2004 |
| JP | A-2004-185263 | 7/2004 |
| JP | A-2006-202186 | 8/2006 |
| JP | A 2006-277337 | 10/2006 |
| WO | WO 2007/058233 A1 | 5/2007 |
| WO | WO 2008/026400 A1 | 3/2008 |

OTHER PUBLICATIONS

Nishiba et al., "The Design and Implementation of WWW Publishing Cluster with Notification-based Synchronization", *Transactions of the Information Processing Society of Japan*, vol. 43, No. 11, Nov. 15, 2002, pp. 3439-3447.

Yamada et al., "An Effect on Query Processing and Load-balancing by Efficient Data Placement on Peer-to-Peer Systems", *Transactions of the Information Processing Society of Japan*, vol. 45, No. SIG 7(TOD 22), Jun. 15, 2004, pp. 93-101.

Japanese Office Action dated Sep. 21, 2010 for Japanese Patent Application No. 2005-216248 (with translation).

Nikkei Electronics, Japan, Nikkei BP, Oct. 6, 1997, No. 700, pp. 131-132, Home Informatization, Appearance of Home "Information Control Tower", Realization of Asynchronois Reproduction of Images (with partial translation).

* cited by examiner

CONTENT REGISTRATION APPARATUS: 100

CONTENTS INFORMATION LIST MEMORIZED IN MEMORY UNIT 102 OF CONTENT REGISTRATION APPARATUS 100

| CONTENT INFORMATION LIST | PREMIERE TIME INFORMATION To | PROSPECTED ACCESS NUMBER A | EVALUATION VALUE VALUE |
|---|---|---|---|
| CONTENT (X1) | To (X1) | A (X1) | VALUE(X1) |
| CONTENT (X2) | To (X2) | A (X2) | VALUE(X2) |
| CONTENT (X3) | To (X3) | A (X3) | VALUE(X3) |
| ⋮ | ⋮ | ⋮ | ⋮ |
| CONTENT (Xn) | To (Xn) | A (Xn) | VALUE(Xn) |

FIG.10

COPY LIST BEFORE PREMIERING CONTENT MEMORIZED IN
MEMORY UNIT 12 OF NODE N

| COPY LIST BEFORE PREMIERE | EVALUATION VALUE | PREMIERE TIME INFORMATION $T_o$ | PREMIERE PREPARATION DURATION E | COPY PRODUCTION START TIME I |
|---|---|---|---|---|
| CONTENT (X1) | VALUE(X1) | $T_o$ (X1) | E (X1) | I (X1) |
| CONTENT (X2) | VALUE(X2) | $T_o$ (X2) | E (X2) | I (X2) |
| CONTENT (X3) | VALUE(X3) | $T_o$ (X3) | E (X3) | I (X3) |
| ... | ... | ... | ... | ... |
| CONTENT (Xn) | VALUE(Xn) | $T_o$ (Xn) | E (Xn) | I (Xn) |

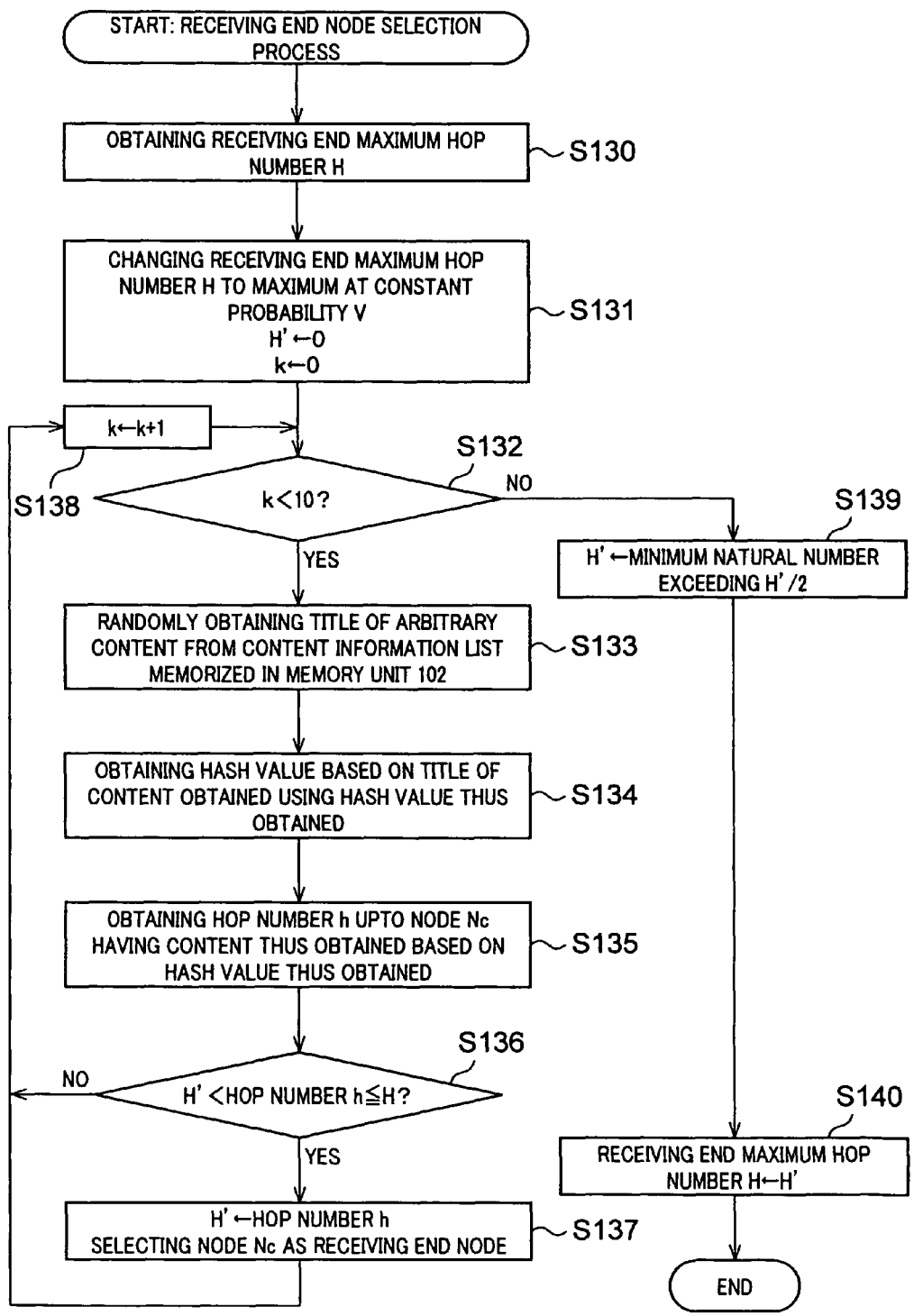

INFORMATION DISTRIBUTION SYSTEM, REGISTRATION APPARATUS, INFORMATION PROCESSING APPARATUS, RECORDING MEDIUM HAVING REGISTRATION PROGRAM MEMORIZED IN IT, AND STORAGE MEDIUM HAVING INFORMATION PROCESSING PROGRAM MEMORIZED IN IT

CROSS REFERENCE TO RELATED APPLICATION

The present application is a Continuation-in-Part of International Application No. PCT/JP2006/310423, filed May 25, 2006, which claims priority from Japanese Patent Application No. 2005-216248, which was filed on Jul. 26, 2005, the disclosures of which are herein incorporated by reference in their entirety.

BACKGROUND OF THE INVENTION

1. Field of the Invention

The present invention belongs to a technical field of an information distribution system, a registration apparatus, an information processing apparatus, a recording medium having a registration program memorized in it, and a storage medium having an information processing program memorized in it.

2. Discussion of the Related Art

In recent years, a delivery system for carrying out so-called content delivery of accessing a server or the like, which stores the above content through a network such as internet, and of enabling to watch and listen content desired to watch and listen after delivering the content thus required to the node is actively researched and developed.

As one of the delivery system, there is a delivery system of directly and mutually sending and receiving the content among nodes belonging to the network, for example there is a delivery system of P2P (pear to pear) type, dispersing each content among a plurality of nodes and enabling the plurality of nodes to use in common. This delivery system of P2P type gets eye as a measure for solving drawbacks of conventional client-server model, i.e. concentration of access to a server and high administration cost.

Further, in this field of research concerning information delivery system of pear-to-pear type as one system of P2P type delivery system, each node does not recognizes link information to all nodes, participating in an overlay network, which is logically constructed in use of for example a distributed hash table (hereinafter referred to as distributed hash table (DHT)), but retains link information (e.g. IP address) to a part of nodes obtained in participating to the overlay network and carries out inquiry of data or the like on the basis of such the link information.

In such the overlay network, even when participation and withdrawal (disembarrassment) are frequently carried out in such the overlay network, it is necessary that dispersion of load should be properly done. Non-Patent Document 1 discloses a technique that dispersion of load is adequately done even when participation and withdrawal (disembarrassment) are frequently done. A proposal concerning production and arrangement in a conventional technique is for example described in the following Patent Document 1 and Non-Patent Document 1.

According to Patent Document 1, there is proposed a method of making and arranging a replica (reproduction) while maintaining a balance of network in its entirety inside a service group on a network with reference to overall size (overall information amount) and number of contents (replicas) existing in each of the nodes, connected inside the service group on the network.

Further, in the Patent Document 2, there is proposed a measure of dynamically making replica in response to access frequency without administrating overall information by giving a number indicative of importance to each of the contents.
Non-Patent Document 1: "Lightweight Load Balancing for Distributed Hash Tables", THE INSTITUTE OF ELECTRONICS, INFORMATION AND COMMUNICATION ENGINEERS, TECHNICAL REPORT OF IEICE
Patent Document 1: Japanese Unexamined Patent Publication No. 2003-99337
Patent Document 2: Japanese Unexamined Patent Publication No. 2003-216521

SUMMARY OF THE INVENTION

In such the delivery system, in a case where a content delivery service is carried out in use of distributed storage technology, because access concentrates on popular contents, it is desirable to copy replica in consideration of popularity. For example, according to a measure described in the Patent Document 2, it is impossible to make a copy in response to the popularity without recognizing actual accesses.

Accordingly, when there are many requests after premiere, there is a problem that access resultantly concentrates on a specific node. Therefore, the present invention is provided in view of the above problem. An object of the present invention is to provide an information distribution system which autonomously distributes and arranges contents as many as a necessary number in a distribution system.

In order to solve the above problem, according to an invention described in claim 1, there is provided an information delivery system having a plurality of information processing apparatuses which can mutually communicate through a network and a registration apparatus which holds at least one or more common information pieces so as to be used in common with the plurality of information processing apparatuses, wherein the registration apparatus including:

a first common information record means for recording at least one or more common information pieces;

a first premiere time information memory means for producing premiere time information indicative of a time when the common information piece, recorded in the first common information record means, can be used in common and storing the same with respect to each of the common information pieces;

a first evaluation information memory means for memorizing evaluation information pieces respectively corresponding to the common information pieces;

a first apparatus selection means for selecting an information processing apparatus which instructs record of the common information piece, subjected to the record instruction, out of the common information pieces recorded in the first common information record means;

a first common information transmission means for transmitting the common information piece, subjected to the record instruction, to the information processing apparatus, which is selected by the first apparatus selection means;

a first premiere time information send means for sending the premiere time information corresponding to the common information piece, subjected to the record instruction, to the information processing apparatus selected by the first apparatus selection means;

a first evaluation information send means for sending the evaluation information piece corresponding to the common information piece, subjected to the record instruction, and a first record instruction information send means for sending a record instruction information piece which instructs to record the common information piece subjected to the record instruction with respect to the information processing apparatus thus selected, wherein the information processing apparatuses including:

an information receiving means for receiving the common information piece, the record instruction information piece related to the common information piece, and the premiere time information and the evaluation value information piece corresponding to the common information piece;

a second common information record means for recording the common information piece, subjected to the record instruction thus received;

a second evaluation information memory means for memorizing the evaluation information piece thus received in association with the common information piece corresponding to the evaluation information piece;

a second premiere time information memory means for memorizing the premiere time information thus received in association with the common information piece corresponding to the premiere time information piece;

a second apparatus selection means for selecting an information processing apparatus out of the plurality of information processing apparatuses for instructing record of the common information piece, subjected to the record instruction out of the common information pieces, which are recorded in the second common information record means;

a second apparatus selection means for selecting an information processing apparatus for instructing record of the common information piece, subjected to the record instruction, out of the common information pieces recorded in the second common information record means;

a second common information transmission means for transmitting the common information pieces subjected to the record instruction to the information processing apparatus, selected with the second apparatus selection means;

an update means for updating the evaluation piece corresponding to the common information piece, subjected to the record instruction;

a second premiere time information send means for sending the premiere time information piece corresponding to the common information, subjected to the record instruction, to the information processing apparatus, selected with the second apparatus selection means;

a second evaluation information send means for sending the evaluation information piece corresponding to the common information piece, subjected to the record instruction and updated with the update means to the information processing apparatus, selected by the second apparatus selection means; and a second record instruction information send means for sending the record instruction information piece which instructs the information processing apparatus thus selected to record the common information pieces, subjected to the record instruction.

According to this, before holding content (common information) in another node so as to be commonly used (before premiere), the content is held by large number of nodes (information processing apparatuses) in advance to thereby distribute and arrange the content inside a system. Therefore, in a case where the large number of nodes request delivery of the content all at once after premiering the content, since the large number of nodes hold the content and therefore it is possible to provide the information delivery system which can relatively smoothly distribute content between each P to P even immediately after premiering the contents in comparison with a case where only one of the nodes hold the content.

BRIEF DESCRIPTION OF THE DRAWINGS

FIG. 10 is an explanatory view of copy list before premiere, memorized in a memory unit 12 of node according to the present embodiment.

FIG. 17 is a flow chart showing receiving end node selection process in a content registration apparatus 100 or a node according to the present embodiment.

DETAILED DESCRIPTION OF THE PREFERRED EMBODIMENTS

Hereinafter, numerical references respectively designate as follows:

11: Control Unit; 12: Memory Unit; 13: Buffer Memory; 14: Decoder Unit; 15: Image Processing Unit; 16: Display Unit; 17: Sound Processing Unit; 18: Speaker; 19: Communication Unit; 20: Input Unit; 21: Bus; 100: Content Registration Apparatus; 101: Control Unit; 102: Memory Unit; 103: Communication Unit; 104: Input Unit; 105: Bus; X: Content; N, Nc, A through O: Node; VALUE: Evaluation Value; To: Premiere Time Information; I: Copy Production Start Time; E: Premiere Preparation Duration; H: Receiving End Maximum Hop Number; h: Hop Number of Node Nc; and Sr: Vacant Record Capacity of Memory Unit 12.

Hereafter, best embodiments of the present invention will be explained on the basis of drawings. Every embodiments described below are about a case where the present invention is applied to a case where contents are delivered from another terminal device to one terminal device in response to delivery request operation of contents, issued by the one terminal device.

(Configuration of System)

Figure 1:
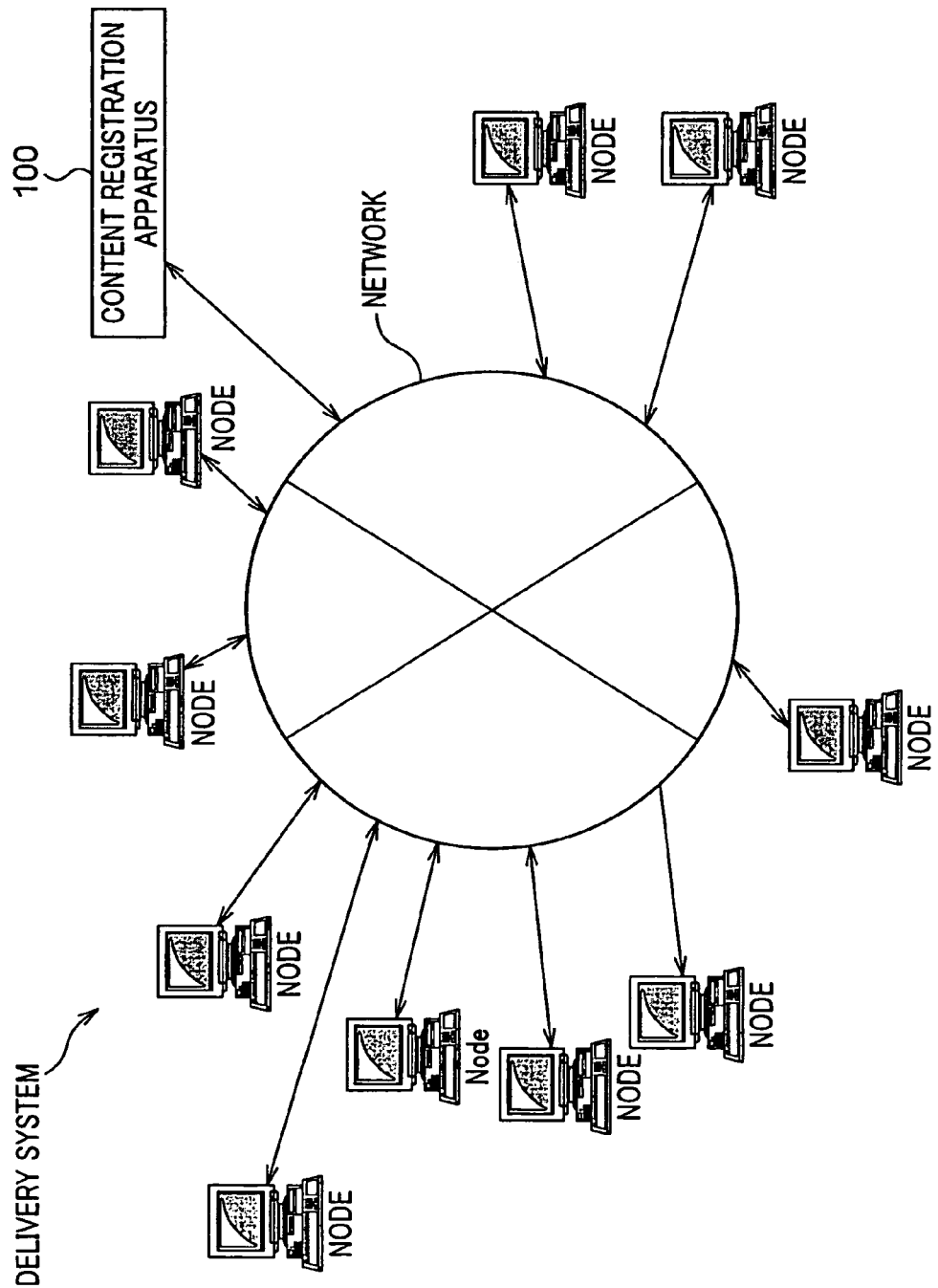
FIG. 1 is a schematic view showing a delivery system of P2P type according to the embodiment.

FIG. 1 is a schematic structural view of a delivery system of P2P type according to the present embodiment. The delivery system includes a content registration apparatus as a registration device for registering contents which are held in a plurality of nodes and each of the nodes so as to be commonly used. The content registration apparatus functions as a registration device according to the present invention, is operated by a content production company or a system manager who is charged to manage content from this content production company, grasps the content existing inside the system, and holds content to be registered inside the system on a database of the memory unit.

(Node Structure)

Figure 2:
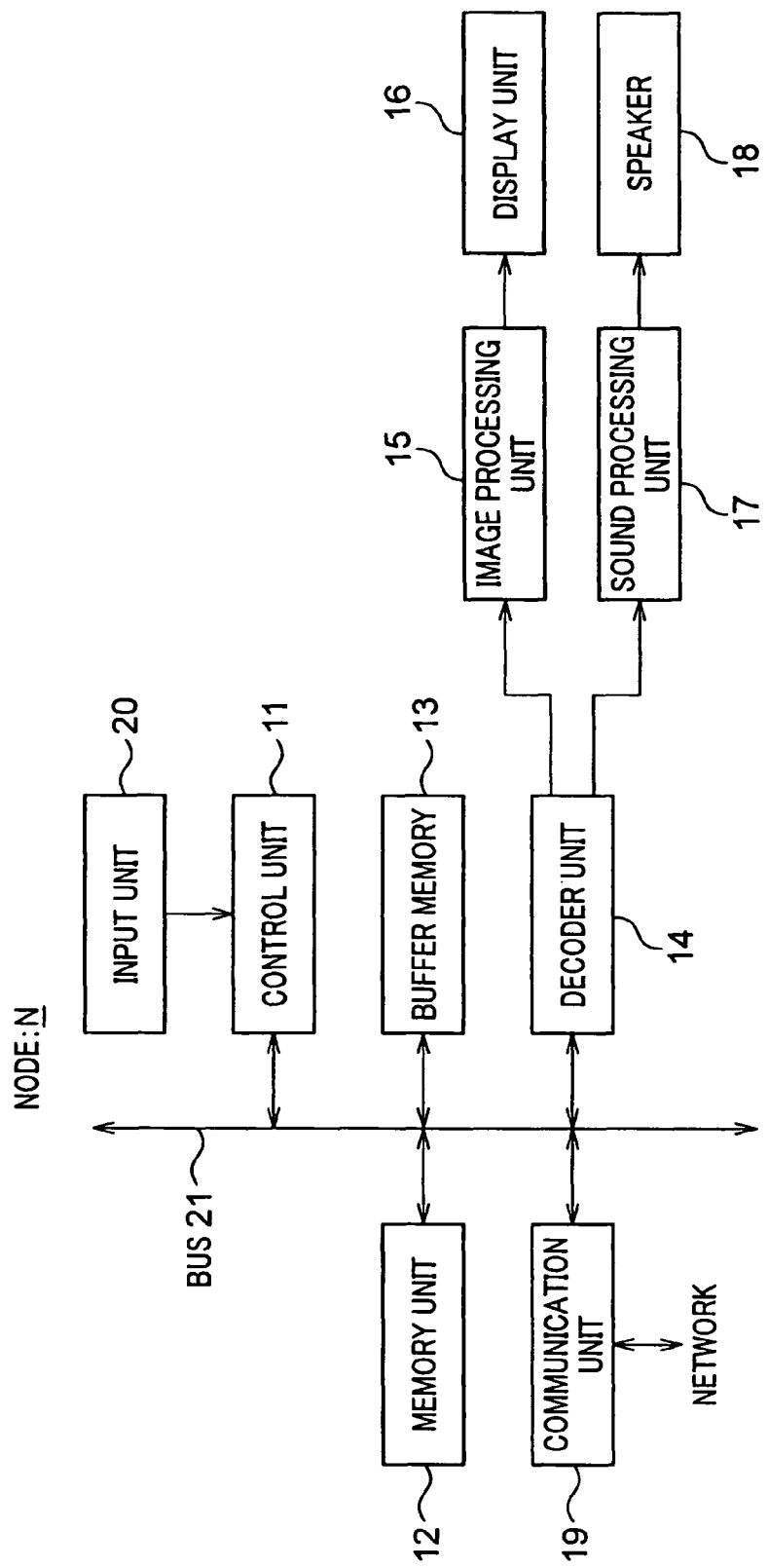
FIG. 2 is a block chart showing a schematic structure of node according to the present embodiment.

First, a schematic structure of every node will be described in reference of FIG. 2. FIG. 2 is a block chart showing a schematic structure of node concerning the embodiment. Because every node belonging to the delivery system of P2P type according to the present embodiment has an identical hardware configuration, structure of an ordinary node N will be described in reference of FIG. 2 as a representative.

As shown in FIG. 2, the node N as a computer included in the delivery system according to the embodiment is constructed by:

a control unit 11 as a second apparatus selection means, an update means, a capacity determining means, a deletion common information selection means, a deletion means and an evaluation value judging means configured by a CPU having calculating capability, a working RAM (Random Access Memory), a ROM (read only memory) for recording various data and programs or the like;

a memory unit 12 as a second common information recording means, a second evaluation information recording means, and a second premiere time information memory means, configured by content data as the above content itself, various routing data necessary for the distribution or the like;

a buffer memory 13 temporally storing the contents data thus received;

a decoder unit 14 for decoding (data extension, decoding or the like) video data (image information) and audio data (sound information) included in the content data and encoded (coded);

an image processing unit 15 for providing a predetermined depiction process with respect to the video data thus decoded, providing and outputting it as video data;

a display unit 16, including a CRT (Cathode Ray Tube), a liquid crystal display or the like, for displaying image based on a video signal outputted from the image processing unit 15;

a sound processing unit 17 for outputting the audio data thus decoded after converting the audio data to an analogue audio signal by D/A (Digital/Analog) conversion and amplifying the same with an amplifier or the like;

a speaker 18 for outputting an audio signal outputted from the sound processing unit 17 as acoustic wave;

a communication unit 19 as an information receiving means, a second common information transmission means, a second premiere time information sending means, a second evaluation information sending means, a second record indication information sending means and a record notification information sending means, which are provided to control communication of information between itself and the other nodes through a network;

an input unit 20 (e.g. keyboard, mouse, and operation panel) for receiving instruction from a user and outputting an instruction signal in response to in response to the instruction to a control unit 11, wherein the control unit 11, the memory unit 12, the buffer memory 13, the decoder unit 14 and the communication unit 19 are connected so as to be mutually receive and send data through a bus 21.

A CPU in the control unit 11 totally controls an overall operation as the node N according to the present embodiment by executing various programs (including the information processing program according to the present invention) which are recorded in the memory unit 12 or the like to thereby cause the node N function as an information processing apparatus according to the present invention in association with the various constitutional elements.

(Structure of Contents Registration Apparatus)

Figures 3, 4:
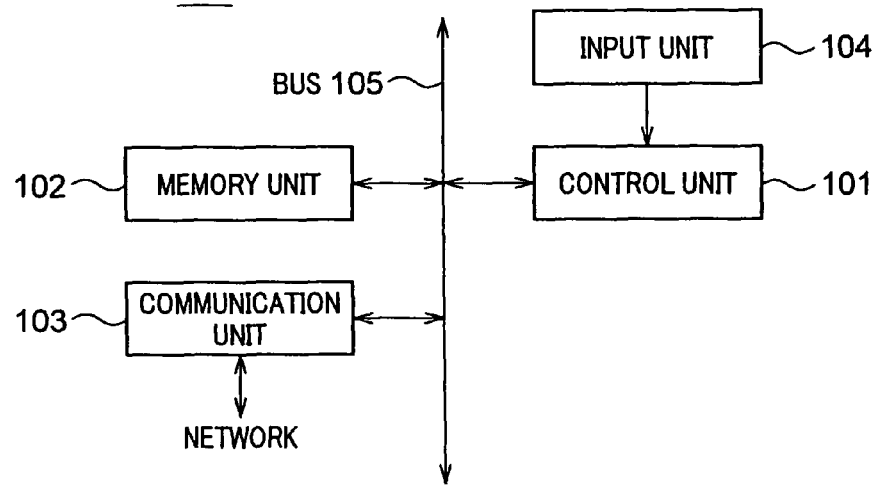
FIG. 3 is a block chart showing a schematic structure of a content registration apparatus 100 according to the present embodiment.
FIG. 4 is an example of content information list stored in a memory unit 102 of the content registration apparatus 100 according to the present embodiment.

Next, a schematic structure of the content registration apparatus 100 is described in reference of FIG. 3. FIG. 3 is a block chart for showing a schematic structure of the content registration apparatus 100 according to the present embodiment. As shown in FIG. 3, the content registration apparatus 100 included in the delivery system according to the present invention includes a control unit 101 as a first apparatus selection means configured by a CPU having a calculation function, a working RAM (Random Access Memory), an ROM (Read Only Memory) for recording various data and programs or the like;

a memory unit 102 configured by content data as content itself, an HDD (Hard Disk Drive) or the like for recording and storing (accommodating) various routing data necessary for the delivery, other necessary program and so on;

a communication unit 103 as a first common information transmission means, a first premiere time information sending means and a first evaluation information sending means for carrying out communication control between itself and various nodes N, included in the distribution system, through a network;

an input unit 104 (e.g. keyboard, mouse and operation panel) for receiving instruction from an administrator, administrating the content registration apparatus, and outputting an instruction signal in response to the instruction to the control unit 31, wherein the control unit 101, the memory unit 102 and the communication unit 103 are connected so that data are mutually sent and received through a bus 105.

The memory unit 102 functions as a first common information record means, a first premiere time information memory means and the first evaluation information memory means. As shown in FIG. 4, content to be newly registered in the delivery system, premiere time information To concerning the content in association with the content data, prospected access number of times A and an evaluation value VALUE(X), calculated in evaluation value calculation process described in detail later, are memorized as a content information list.

When the CPU in the control unit 101 carries out various programs (including the registration program of the present invention) recorded on the memory unit 102 or the like, the control unit 101 totally controls an overall operation of the content registration apparatus according to the embodiment and causes the content registration apparatus function as the registration apparatus according to the present invention in association with the various constitutional elements.

The control unit 101 functions as a first apparatus selection means, a first common information transmission means, a first premiere time information sending means, a first evaluation information sending means and a first record instruction information sending means, wherein a node N to be instructed to record content (X) is selected in "contents registration process" and transmits the content data of the content (X), the premiere time information To memorized in association with the content information list of the memory unit 102 and the evaluation value VALUE (X) to the node N thus selected along with copy production message as a record instruction information for instructing record of the content data of the content (X).

Hereinafter, processing will be concretely described. In describing all of processes according to the embodiment, calculation of duration may be carried out. On this occasion, unit of the calculation (second, minute, day. week, month and year) may be calculated while standardizing the units.

(1. Content Registration Process by Content Registration Apparatus)

Figure 5:
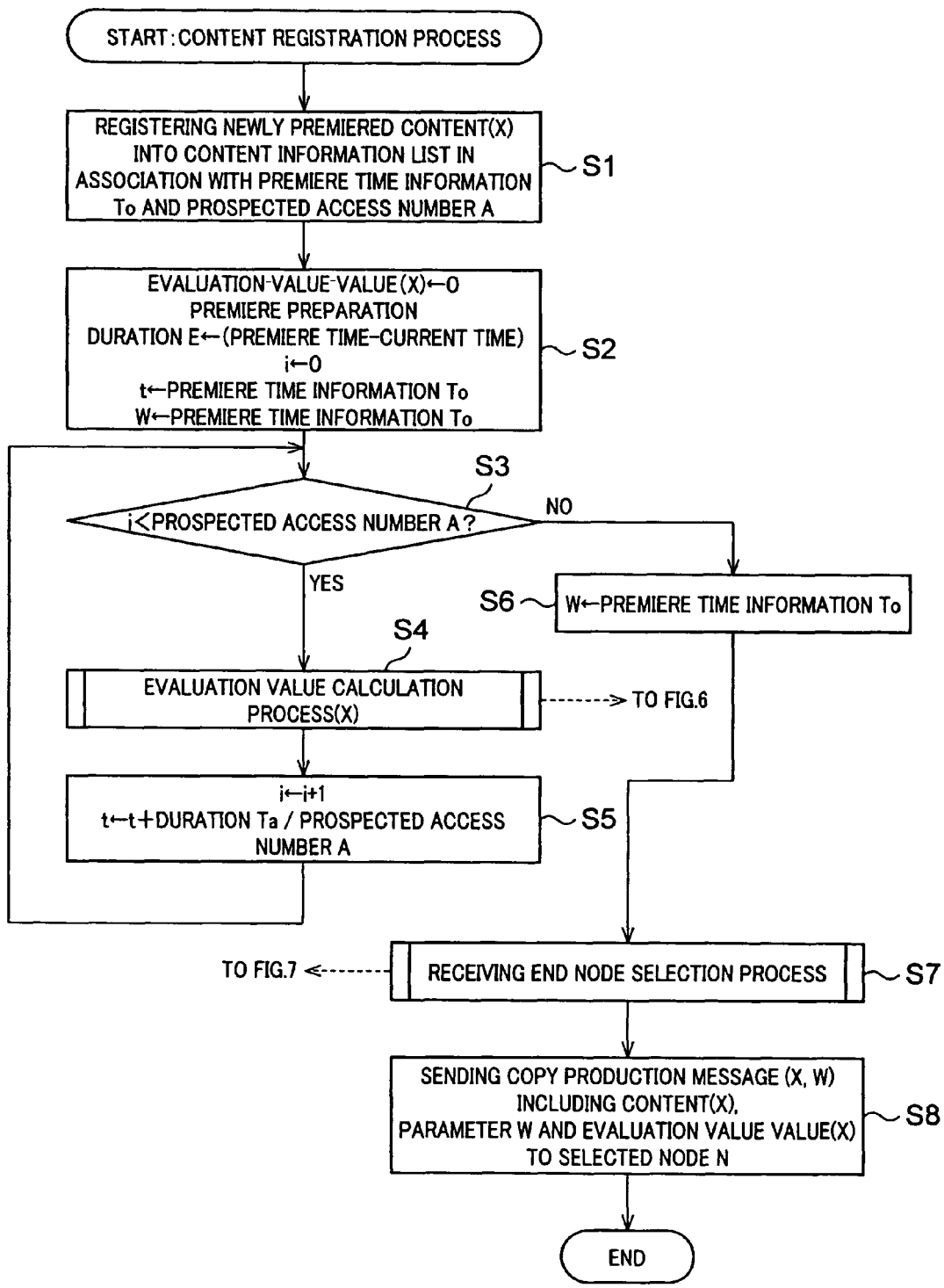
FIG. 5 is a flow chart showing contents registration process according to the present embodiment.

First, a process (contents registration processing) of charging contents to a distribution system by the contents registration apparatus according to the embodiment, namely a procedure of selecting a node N, sending a new content to be commonly owned inside the system to the node N thus selected and causing the node N hold the content will be described in reference of FIG. 5. The content registration processing is carried out by executing the registration processing program based on control by the control unit 101 when an administrator wishes to add a new content.

First, a content (X) to be newly premiered is registered in a content information list of the memory unit 102 in correspondence with various information pieces (Step S1). More specifically, an administrator or the like of the content registration apparatus 100 operate the input unit 104 to thereby input and register premiere time information To and prospected access number of times A between the premiere and a time duration Ta (e.g. the time duration Ta being one week) in association with the content (X).

Subsequently, 0 (zero) is entered into an evaluation value VALUE (X), a value obtained by subtracting a current time from the premiere time indicated by the premiere time information of the content (X) is entered into a premiere preparation duration E, 0 (zero) is entered into a variable i, and each of the values is initialized after entering a parameter W and a variable t into the premiere time information To (Step S2).

The parameter W is a copy coefficient used for adjusting the evaluation value of the content (X) in consideration of an entire distribution system according to the embodiment when a replica (reproduction) of the content (X), memorized in the node N on a sending end, is produced inside a node N on a receiving end. The premiere time information To is included in a copy production message using the premiere time information To as the parameter W before the premiere. By this, in a first evaluation value acquisition calculating process or the like in response to access number carried out at a time of sending and receiving the content (X) between a node N, which receives a copy instruction of the contents (X), and the other nodes N after the premiere, it is possible to first use the premiere time information To as a parameter W indicative of "a time obtaining a finally evaluated VALUE (X)" to the contents (X). Therefore, it is possible to smoothly proceed with a consistent process from a process before the premiere to a process after the premiere.

A detailed explanation of measures of calculating evaluation value after premiere is described in detail in Japanese Unexamined Patent Publication No. 2005-095639, which is hereby incorporated by reference, concerning measures of calculating evaluation value in response to access number of each nodes N after premiering the content, and description of the measures is omitted.

Next, it is judged whether the variable i is smaller than the prospected access number A (Step S3). When it is judged that the variable i is smaller than the prospected access number A (Step S3: Yes), "evaluation value calculation process (X)" is carried out (Step S4). Then 1 is added to the variable i and a value obtained by adding a value, obtained by dividing a time duration Ta with the prospected access number A, to the variable t (Step S5). After that, the process returns back to Step S3 again and the judgment is carried out again. In the process of Step S5, "value obtained by dividing a time duration Ta with the prospected access number of time A" is provided to prospect and define a frequency (e.g. once in a hour, or once in ten seconds) of accessing to the content (X) during the premiere and the time duration Ta when the premiere time of the contents (X) reaches and premiered. The access to the contents (X) means request for distributing the content. Not only access to the node N which receives the contents (X) from a contents registration apparatus 100 and first records the same but also access to content (X) in another node N which receives the content (X) from the first node N on the basis of "copy production process before premiering the content" to be described below in detail are included.

On the other hand, in the process of Step S3, a parameter W, which is changed in "evaluation value calculating process (X)" to be described below, is set again inside the premiere time information To in a case where (Step S3: No) it is judged that the prospected access number A is the variable i or more (Step S6).

Further, the control unit 101 functions as a first apparatus selection means, a first common information transmission means, a first premier time information sending means, a first evaluation information sending means, and a first record instruction information sending means carries out receiving end node selection process for selecting a node N which holds (records) the contents (X), subjected to record instruction, to be commonly owned (Step S7), and sends copy production message (X, W) as a record instruction information including the contents (X) and an evaluation value VALUE (X) of the contents to a node N selected in the selection process. Thus the process ends.

In Step S8, the copy production message (X, W) for instructing to record the contents (X) includes a parameter W (including the publication time information To (X) since it is before premiere), and it is sent to the node N which is selected along with the evaluation value VALUE (X) of the contents (X) and the contents data. If various data are associated by for example attaching identification information, it is possible to individually send the various data.

(1-1. Evaluation Value Calculation Process)

Figure 6:
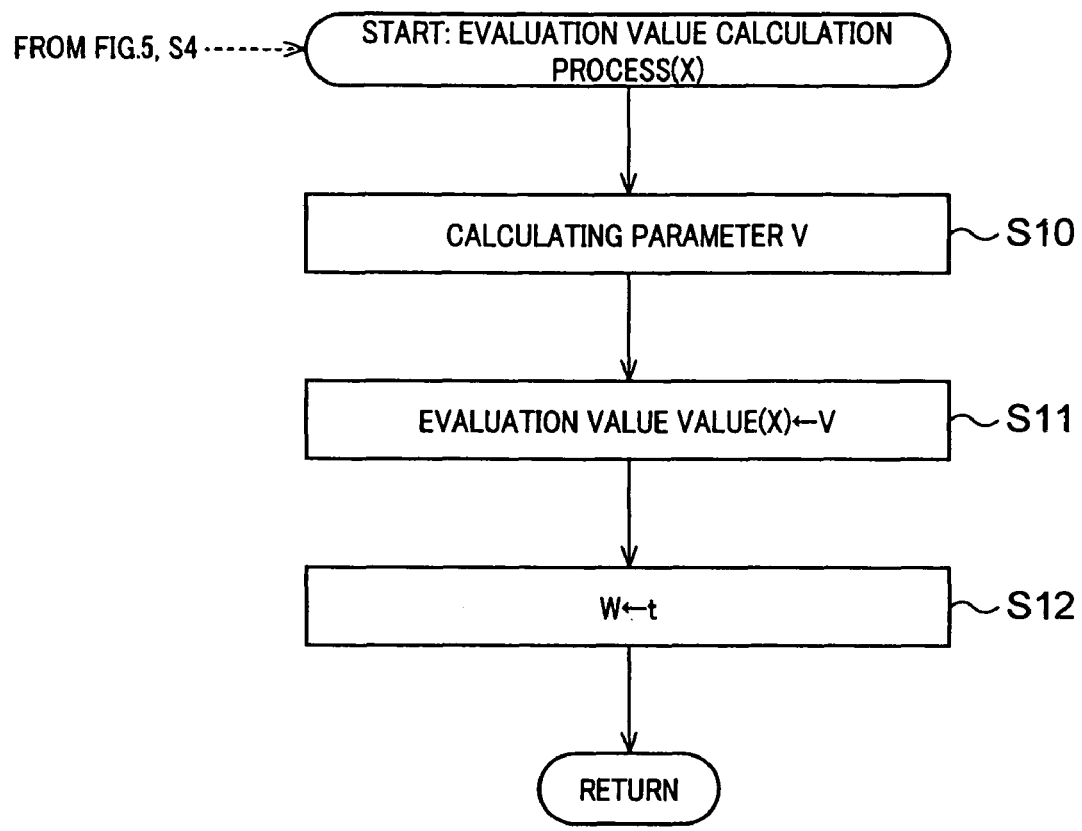
FIG. 6 is a flow chart showing evaluation value calculation process in the content registration apparatus 100 according to the present embodiment.

Subsequently, the evaluation value calculation process in Step S4 is described in reference of a flow chart in FIG. 6.

First, the parameter V is calculated and obtained on the basis of the following formula (1) and also based on the current evaluation value VALUE(X) of the contents (X) and the parameter W and the variable t (Step S10).

[Formula 1]

$$V = \text{VALUE}(X) \times d^{t-W} + 1 \qquad (1),$$

where d represents an attenuation parameter having a value between 0 to 1, designates a rate of attenuating an evaluation value per a unit time and is used after the premiere.

After sending the contents (X) to a node N thus selected, it is sent to a plurality of nodes N until the premiere time comes and the copy production process before the premiere is continued to be carried out in each of the nodes.

In Formula (1), (t−W) represents an elapsed time from a previous access time to a time t. The time t is a "current time" in processing after the premiere. In the evaluation value calculation process in the contents registration process before the premiere, it is possible to calculate the evaluation value after the premiere of the contents before premiering the contents. Accordingly, a portion of "VALUE(X)×d^(t−W)" is an evaluation value at the time t. What obtained by adding one as a previous access to this becomes the above Formula (1) for obtaining parameter V.

Then the parameter V obtained as described above is updated as a new evaluation value VALUE (X) of the contents (X) on the contents information list. (Step S11)

For example, in the above formula (1), in a case where the attenuation parameter d is set up so that the evaluation value attenuates 10 percent every one hour, and three hours elapse from a previous evaluation value calculation processing (X), the parameter V is obtained as follows in use of Formula (1) described above.

[Formula 2]

$$V = \text{VALUE}(X) \times 0.9^3 + 1 \quad (2)$$

After the variable t is entered into the parameter W (Step S12), the process ends.

<1-2. Process of Selecting Node on Receiving End>

Next, a process of selecting node on receiving end in Step S7 will be described in reference of a flow chart shown in FIG. 7.

First, a title of arbitrary content is randomly acquired from a contents information list, memorized in the memory unit 102 (Step S20). This content may be a content (X) subjected to record instruction or another content which has been thrown into a system in the past. It may be a title of content known by the content registration apparatus, a part of the title of the content or a predetermined letter string randomly generated.

Subsequently, a hash value is obtained on the basis of the title of the contents obtained in use of a predetermined hash function (Step S21). Then one node N is searched on the basis of the hash value thus obtained, and the one node N (e.g. the root node of the arbitrary content) thus discovered is selected as the node on the receiving end. Thus the process ends (Step S22). A schematic measure for searching the node N is a search method using a so-called DHT (Distributed Hash Table) in a case of the distribution system of the above P2P type. In this case, a root node, a keyword root node and the like of the content may be selected as a receiving end node.

Further, it is configured such that destination information such as IP address of the node N thus selected is obtained and temporally memorized in a RAM or the like of the control unit 101. In Step S8 of processing to register the contents described above, it is configured to send the copy production massage (X, W) including the contents (X) to a node N thus selected on the basis of the destination information.

As described above, the contents registration apparatus 100 can throw in (register) a new content into the distribution system by sending the new content to and instructing to hold the same in any of nodes N inside the system.

Further, it is possible to inform the node N selected to record the contents (X) of the premiere time by sending the premiere time information To (parameter W in Step S7) of the content (X) to the node N. Further, since the evaluation value VALUE (X) is sent to the node N selected to record the contents (X), which is determined in response to the prospected access number A, it is possible to produce a copy of the content respectively for other nodes N as many as an appropriate number in "2-1. copy production processing before premiering content" to be described in detail later on the basis of the evaluation value VALUE (X).

(2. Basic Process in Each Node)

Figure 8:
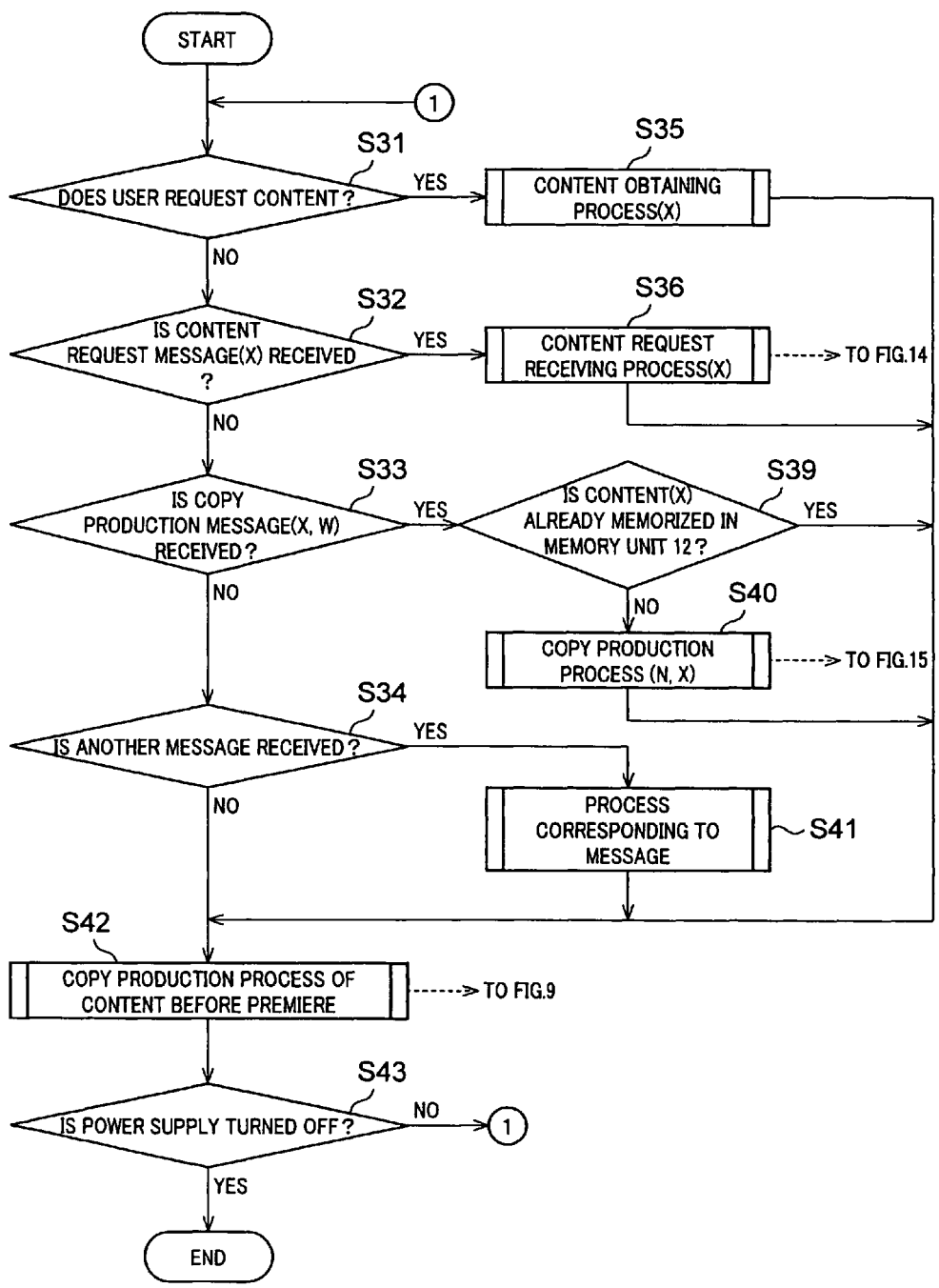
FIG. 8 is a flow chart showing basic process in a node according to the present embodiment

Next, basic process in each node N according to the embodiment is described in reference of a flow chart in FIG. 8. The process is carried out by executing a program on the basis of control of the control unit 11 in the node N.

First, it is monitored whether or not a delivery request operation of content is carried out by a user of operating the input unit 20 (Step S31). When the delivery request operation is carried out (Step S31: Yes), "content obtaining process (X)" is carried out (Step S35). Then the process moves to Step S42. The processing method of the content obtaining process (X) is carried out in use of a searching measure using DHT for searching a node holding contents after hashing a title or the like of the content with a predetermined hash function.

Meanwhile, when a delivery request operation of the content is not carried out in the above judgment of the Step S31 (Step S31: No), it is judged whether or not the content request message (X) for requesting delivery of content (X) is received from another node (Step S32). Then in a case where the content request message (X) is received (Step S32: Yes), the "content request receipt process (X)" is carried out (Step S36), and the process moves to Step S42. The "content request receipt process (X)" will be described in detail later.

On the other hand, in a case where the content request message (X) is not received in the judgment of Step S32 (Step S32: No), the control unit 11 functions as an information receiving means, and it is judged whether the copy production message (X, W) as the record instruction information for requesting copy of the content (X) is received from the other node or the contents registration apparatus 100 (Step S33). The copy production message (X, W) sent from the other node is also similar to a copy message (X, W) from the content registration apparatus 100. Originated from production of the contents data of the content (X) and a replica (reproduction) of the content (X) memorized in the node (N) on the sending side, a parameter W (a parameter W is entered into the premier time information To before the premiere) as a copy coefficient used for adjusting the evaluation value of the content (X) as the entire delivery system according to the embodiment is included.

In a case where the copy production message (X, W) is received in Step S33 (Step S33, Yes), it is judged whether or not the content (X) is already memorized in the memory unit 12 of its own (Step S39). When it is memorized (Step S39: Yes), the process moves to Step S42. When it is not memorized (Step S39: No), the process moves to Step S42 after "copy production process (X)" is executed. The "copy production process (X)" will be described later in detail.

Meanwhile, in a case where the copy production message (X, W) is not received in Step S33 (Step S33: No), it is judged whether or not the other message is received (Step S34). When it is received (Step S34: Yes), the process moves to Step S42 after a process corresponding to the message thus received is carried out (Step S34: Yes). The other message is a query in DHT, publish message or the like.

Subsequently, "copy production processing before the contents are premiered" is carried out (Step S42) on the basis of the evaluation value VALUE and the parameter W with respect to each of the contents not yet premiered and memorized in the memory unit 12, the contents being transmitted from the contents registration apparatus 100 or the other nodes, in Step S42. The "copy production processing before the contents are premiered" will be described in "2-1. copy production processing before content is premiered" in detail.

Thereafter, it is confirmed whether or not the power source is turned off (Step S43). If the power source remains turned on (Step S43: No), the process returns to Step S31 described above and the processes of from Step S31 to Step S43 are repeated. If the power source is turned off (Step S43: Yes), the process ends.

(2-1. Copy Production Processing Before the Contents are Premiered)

Figure 9:
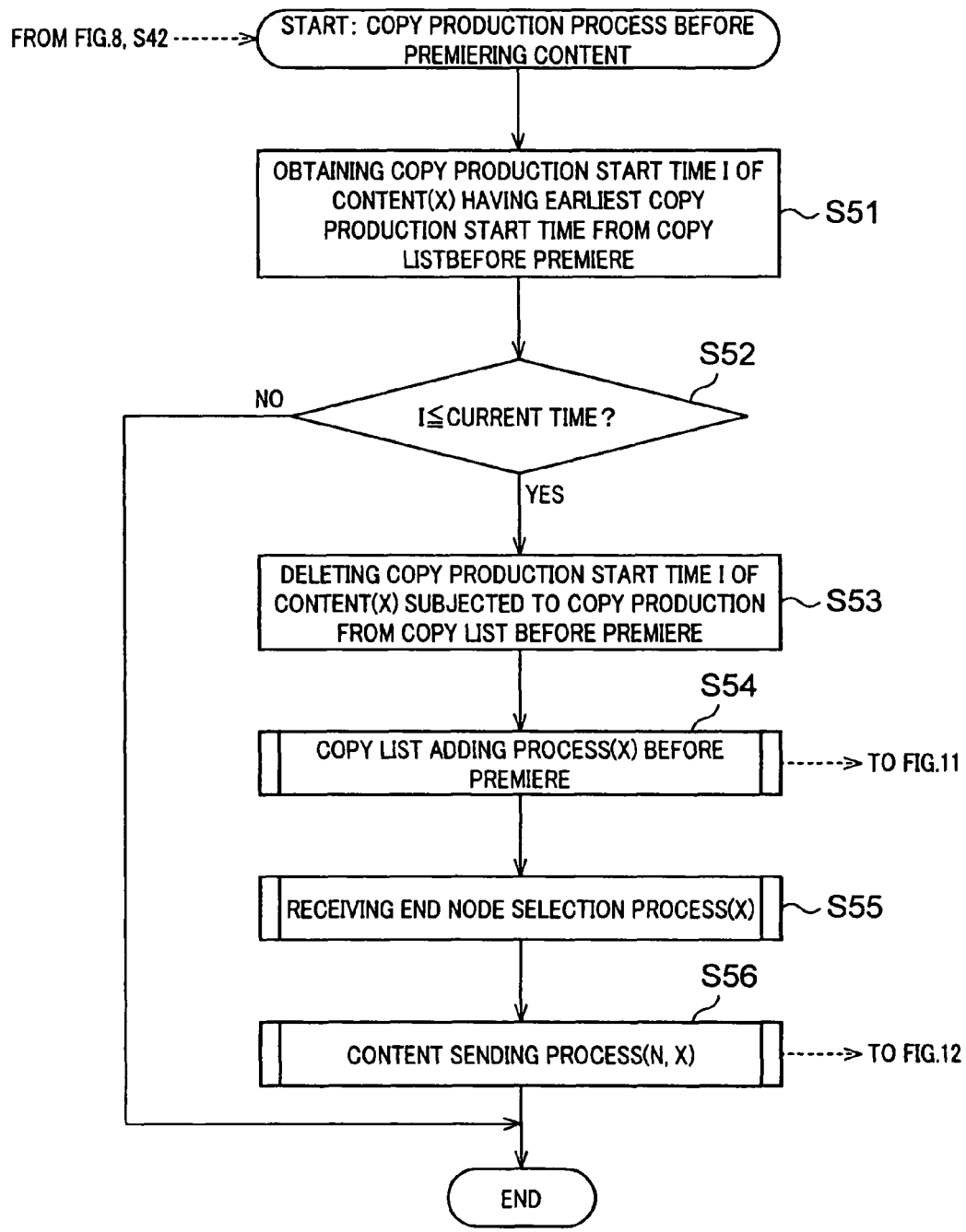
FIG. 9 is a flow chart showing copy production process in a node according to the present embodiment before premiering content.

Subsequently, "copy production processing before the content is premiered" in Step S42 will be described in reference of the flow chart shown in FIG. 9.

First, a content (X) having an earliest copy production start time I is obtained from the copy list before premiere, which is memorized in the memory unit 12 (Step S51). When the content data of the content, the premiere time information To of the content (receivable as the parameter W), and the evaluation value V of the content are received along with the copy production message (X, W) as record instruction information for instructing to record the content from the contents registration apparatus 100 or the other nodes N, a copy list before content is premiered as shown in FIG. 10 is produced in the memory unit 12.

Among the contents in the copy list before premiere, a copy production start time I of a content having the earliest copy production start time I is obtained. A copy production start time I, when a copy of certain content (X) should be started to produce next, is calculated in "copy list adding process before premiere (X)" in Step S54 succeeding thereto. The copy production start time I is registered in a copy list before premiering the content shown in FIG. 10. When the earliest copy production process in the node N (in other words, when the copy production process before premiere is not carried out at all since the content is received from the content registration apparatus 100 and the other nodes), the copy production start time I is previously calculated and received from the contents registration apparatus 100 and the other nodes, which send a copy production message (X, W) as record instruction information of the contents. Although the copy production start time I is obtained on the basis of evaluation value of the content, after copy of the content (X) is produced, "evaluation value division process" to be described in detail below is executed, and the evaluation value VALUE(X) is halved. The node N, which receives record instruction of the content by receiving the copy production message (X, W), should receive the evaluation value VALUE(X) thus halved. Therefore, it is convenient that the copy production start time I previously calculated with the content registration apparatus 100 and the other nodes, which are on the sending end, is included in the copy production message (X, W) and received.

Subsequently, it is judged whether or not the current time passes over the copy production start time I (Step S52). If it does not pass over (Step S52: Yes), the process ends since it is unnecessary to produce the copy of content.

On the other hand, when the current time exceeds a copy production start time I (Step S52: No), the copy production start time I(X) of content (X) to be copied is deleted (Step S53), "copy list adding process (X) before premiere", "node selection process (X) on sending end", and "content sending process (N, X)" are respectively carried out (Step S54, 55, 56).

In the "node selection process (X) on receiving side" in the Step S55, a process similar to "1-2. node selection process (X) on receiving end" in a content registration terminal 100 is carried out. The control unit 11 functions as a second apparatus selection means, and one node (e.g. root node of arbitrary content memorized in the memory unit 12) is selected. Therefore, description herein is omitted.

Hereinafter, "copy list adding process (X) before premiere" in Step S54 and "content sending process (N, X)" in Step S56 will be described in detail.

(1) Copy List Adding Process Before Premiere

Figure 11:
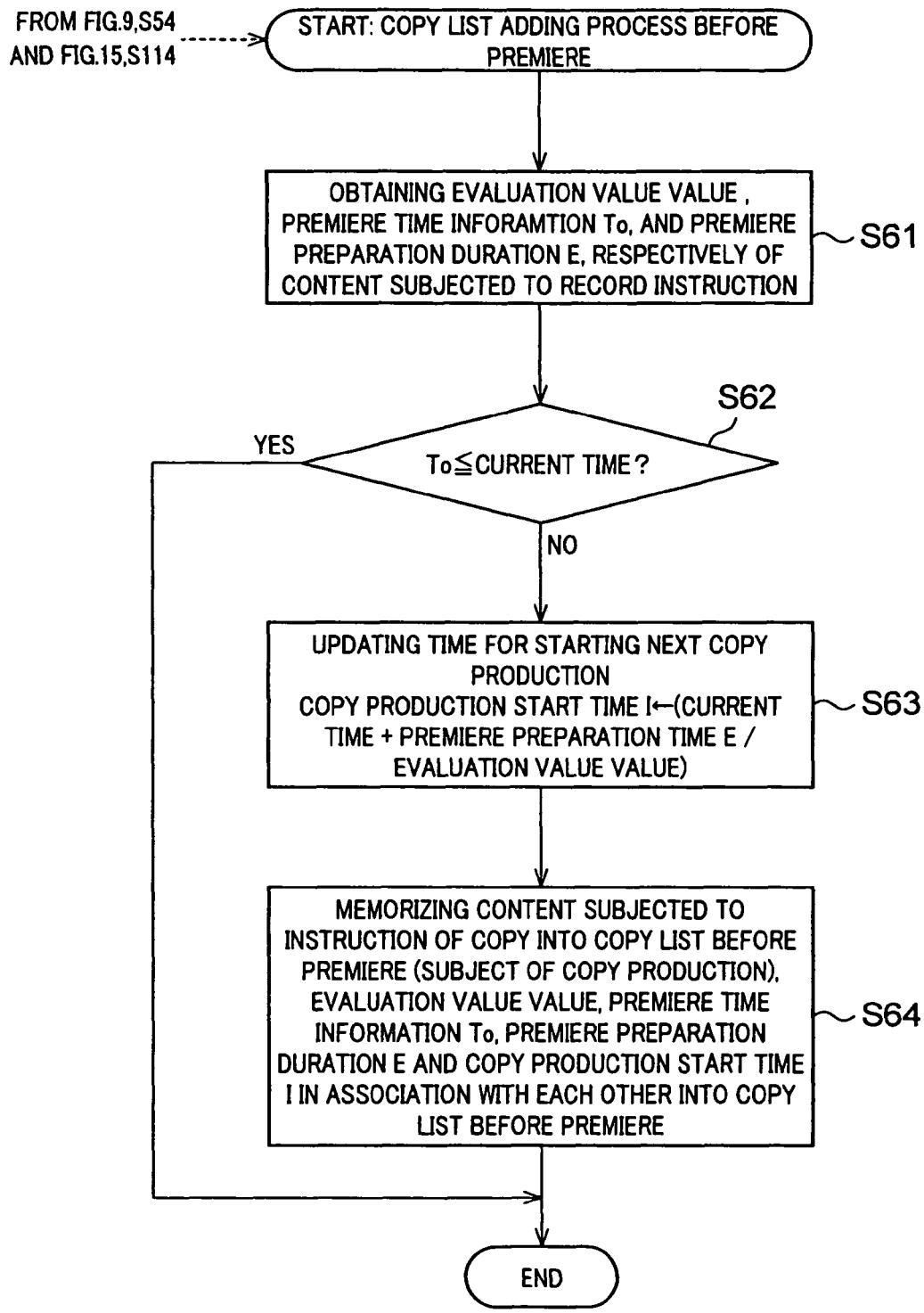
FIG. 11 is a flow chart showing list adding process before premiere in a node according to the present embodiment.

First, "list adding process before premiere" in Step S54 will be described in reference of flow chart shown in FIG. 11.

First, in the above described Step S51, the evaluation value VALUE (X), the premiere time information To(X), and a premiere preparation time E(X) of the content(X), selected as the content having the earliest copy production start time, are acquired from the copy list before premiere (Step S61).

In the following explanation, the process is carried out with respect to the content (X) selected as the content having the earliest copy production starting time. Even if it is not explicitly described, the following evaluation value, the premiere time information, premiere preparation time duration E, and copy production starting time are respectively evaluation value VALUE(X), premiere time information To(X), premiere preparation duration E(X), and copy production start time I(X).

Subsequently, it is judged whether or not the current time passes over the premiere time information To (Step S62). If it does not pass over (Step S62: Yes), anew copy production start time I is defined by adding a value obtained by dividing the premiere preparation time E by the evaluation value VALUE to the current time so as to update a time for starting production of copy next (copy production start time I) (Step S63).

Then the process ends after store memorizing (Step S64) the content to be instructed to record (subject of copy production), the evaluation value VALUE, the premiere time information To and the premiere preparation duration E in association with the copy list before premiere memorized in the memory unit 12.

On the other hand, in the process of Step S62, if the current time passes over the premiere time information To (Step S62: No), the process ends as-is.

As a measure to realize the content thus copied, (Measure 1)

After a lapse of the premiere time, namely when it is judged that the premiere time information elapses over the premiere time information To in Step S62, the premiere message (publish) is transferred by DHT routing and registered with respect to a route node of the contents.

(Measure 2)

At a stage that the contents are copied, an event namely the content is held is previously sent by a DHT routing to a route node of the content, the route node administrates the node memorizing the contents, the premiere time is monitored by a process of the content registration apparatus 100. When the premiere time comes, by inserting the content into "contents list available", it is configured that the content can be first accessed from the other nodes.

The present invention can be practiced by any of the measures. In this embodiment, the measure 2 is used for description. Accordingly, in the process of Step S62, when if the current time elapses over the premiere time obtained from the premiere time information To, the process is finished as is. In Step S112 of "Copy Production Process (N, X)" described below, a possession message indicating that the new content is possessed in a route node, being the administration apparatus, is notified.

Further, the "content list available", administrated with the content registration apparatus 100, can be referred to for example when each node inside the delivery system wishes to search for contents to access, and a list where information of all contents which can be currently referred to are listed among the contents registered inside the delivery system. This "content list available" is updated with the content registration apparatus 100 when the premiere time comes. Namely, even though the content is registered in the route node before the premiere, the content is not inserted in the list after the premiere time based on the premiere time information elapses. Therefore, it is not possible to access the content from any node.

(2) Content Sending Process (N, X)

Figure 12:
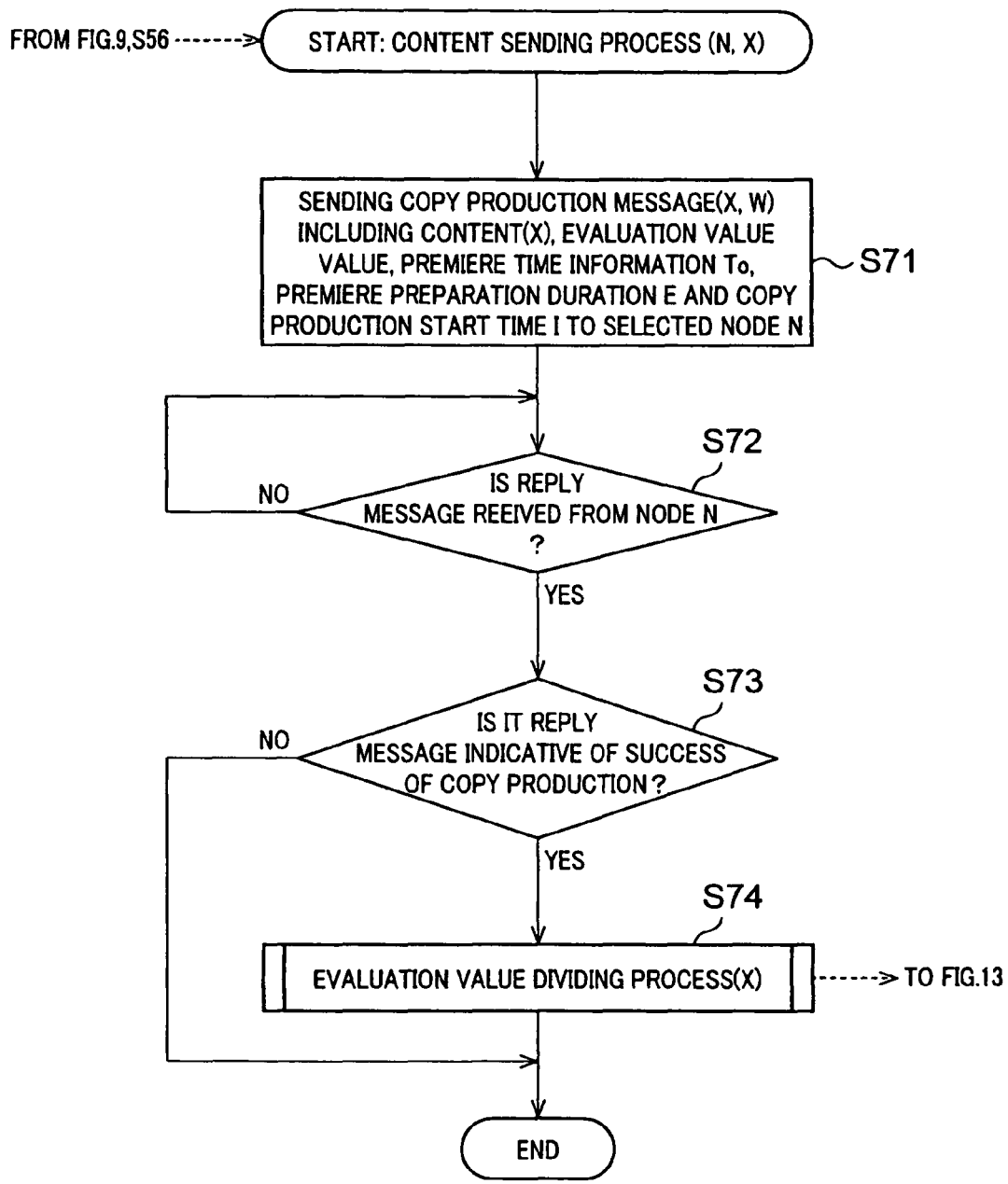
FIG. 12 is a flow chart showing content sending process in a node according to the present embodiment.

Subsequently, "content sending process (N, X)" in Step S56 will be described in use of a flowchart shown in FIG. 12. Explanation will given on a premise that in processing Steps S51 to 53 of "2-1. copy production process before premiering content", a node N on the sending end of the copy production message (X, W) for instructing record of the content is selected in Step S55, and receiving end information of the node N is obtained.

First, the control unit 11 functions as a second common information transmission means, a second premiere time information sending means, a second evaluation information sending means and a second record instruction information sending means, and sends a copy production message (X, W), including the content (X), the evaluation value VALUE (X), the premiere time information To(X), the premiere preparation duration E(X) and the copy production start time I(X), to the node N on the basis of destination information of the node N, selected in "node selection process on a receiving end" in Step S55.

Subsequently, it is judged whether or not a reply message from the node N on the receiving end is received (Step S72). If the reply message is received (Step S72: Yes), it is judged by the node N whether or not the reply message is a reply message indicative of success of copy production of contents (X) (Step S73). Although process of the judgment in Step S72 is repeated until the reply message is received, if a predetermined time elapses, a timeout is provided so as to move to Step S73 as the reply message is not received (Step S72: No).

In a case where it is judged the reply message not indicating that the copy production succeeds in the process of Step S73 (Step S73: No), the process ends. In a case where it is judged the reply message indicating that the copy production succeeds in the process of Step S73 (Step S73: Yes), "evaluation value division process (X)" is carried out in Step S74 in order to reduce the evaluation value VALUE (X) upon the once success of the reproduction copy, and the process ends.

Figure 13:
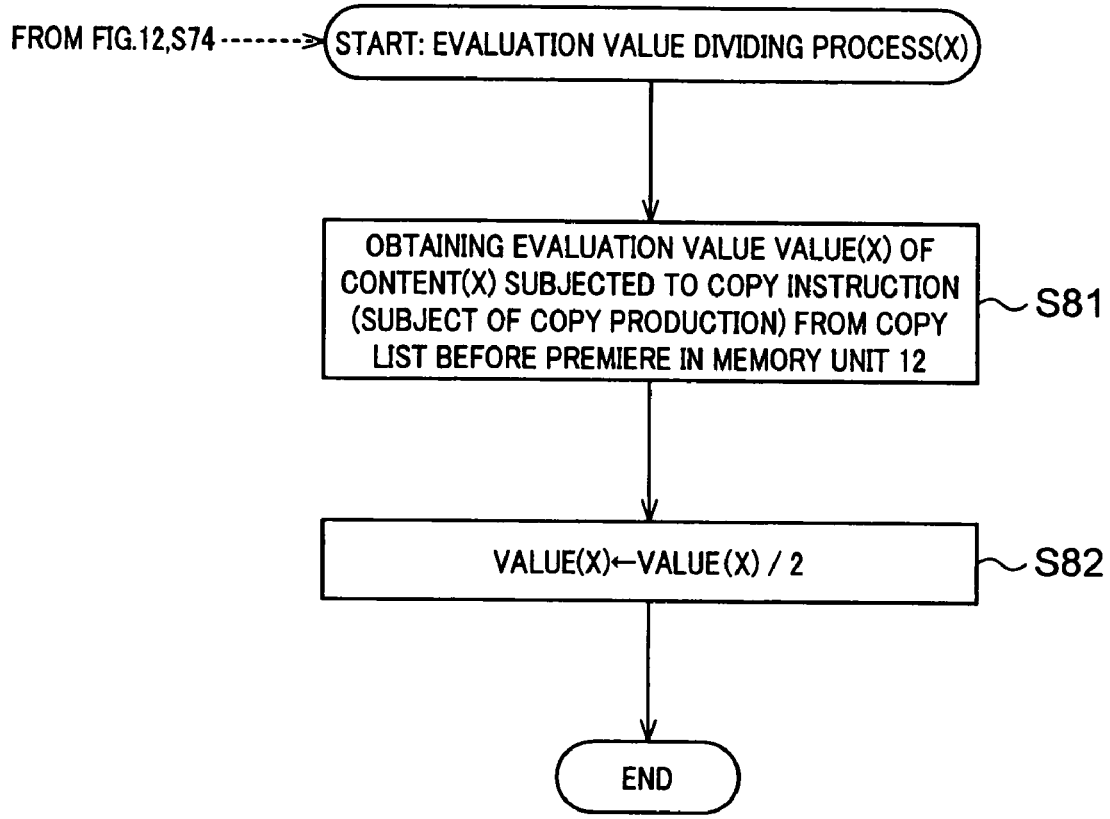
FIG. 13 is a flow chart showing evaluation value dividing process in a node according to the present embodiment.

Subsequently, the evaluation value division process (X) will be described in reference of FIG. 13.

First, the evaluation value VALUE of the content (X) to be instructed to record by producing a copy is acquired from the copy list before premiering content in the memory unit 12 (Step S81). The control unit 11 functions as an update means, and updates the evaluation value thus acquired to be smaller. For example, the process ends by memorizing a value, obtained by halving the evaluation value thus obtained, into the copy list before premiering content in the memory unit 12 as a new evaluation value VALUE in association with the content (X) (Step S82).

(2-2. Contents Request Receiving Process)

Figure 14:
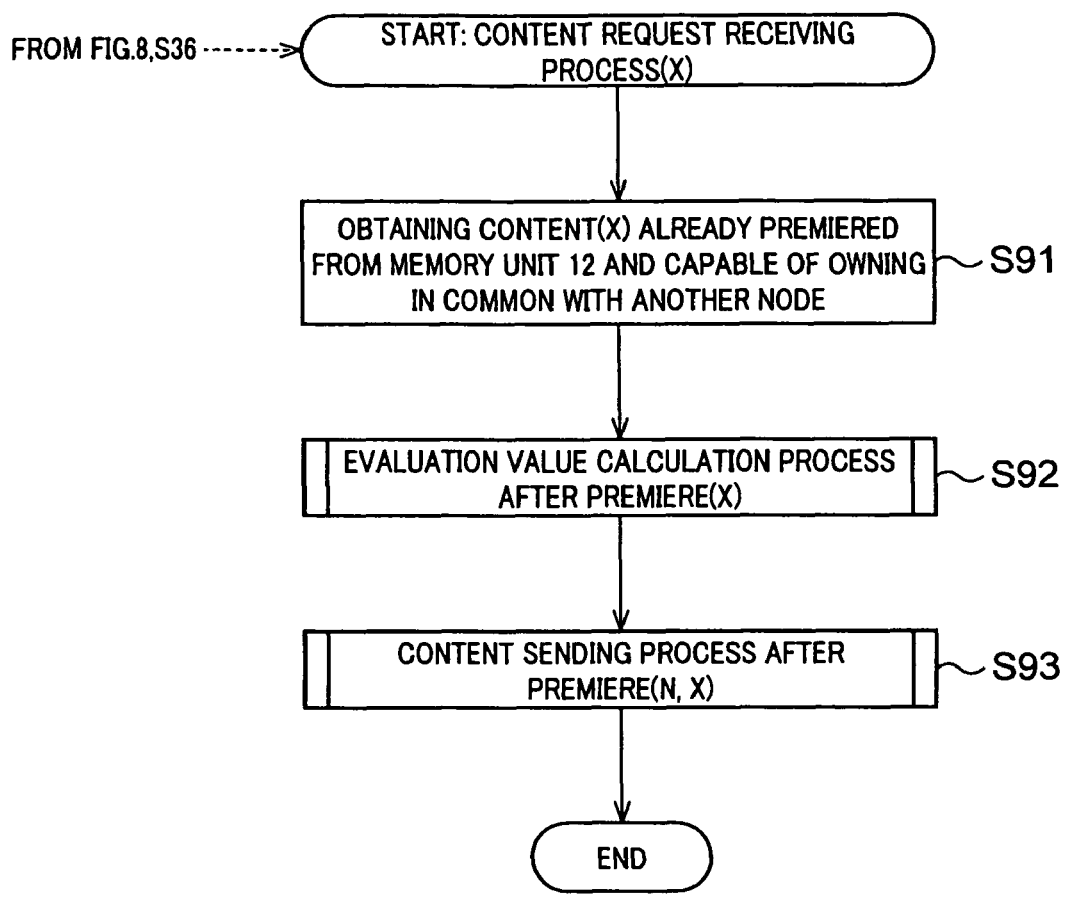
FIG. 14 is a flow chart showing content request receiving process in a node according to the present embodiment.

Subsequently, "content request receipt process (X)" in Step S36 (vide FIG. 8) of "2. basic process of each node" will be described in reference of FIG. 14. This process is carried out when delivery request of the content (X), already premiered from another node which can be owned in common, is received. The node carrying out the process can be said a node functioning as a content holder for holding content in DHT.

First, when the delivery request of content is received, the content already premiered from the memory unit 12 and owned in common with the other nodes are obtained (Step S91).

Subsequently, "evaluation value calculation process after premiere (X)" and "content sending process after premiere (N, X)" are carried out (Step S92, S93). Thereafter, the process ends. Explanation of the "evaluation value calculation process after premiere (X)" and "content sending process after premiere (N, X)" are omitted since these are described in a patent application (Japanese Patent Application No. 2005-095639) related to measure of the evaluation value calculation in response to access number of each node N after premiering content.

(2-3. Copy Production Process)

Figure 15:
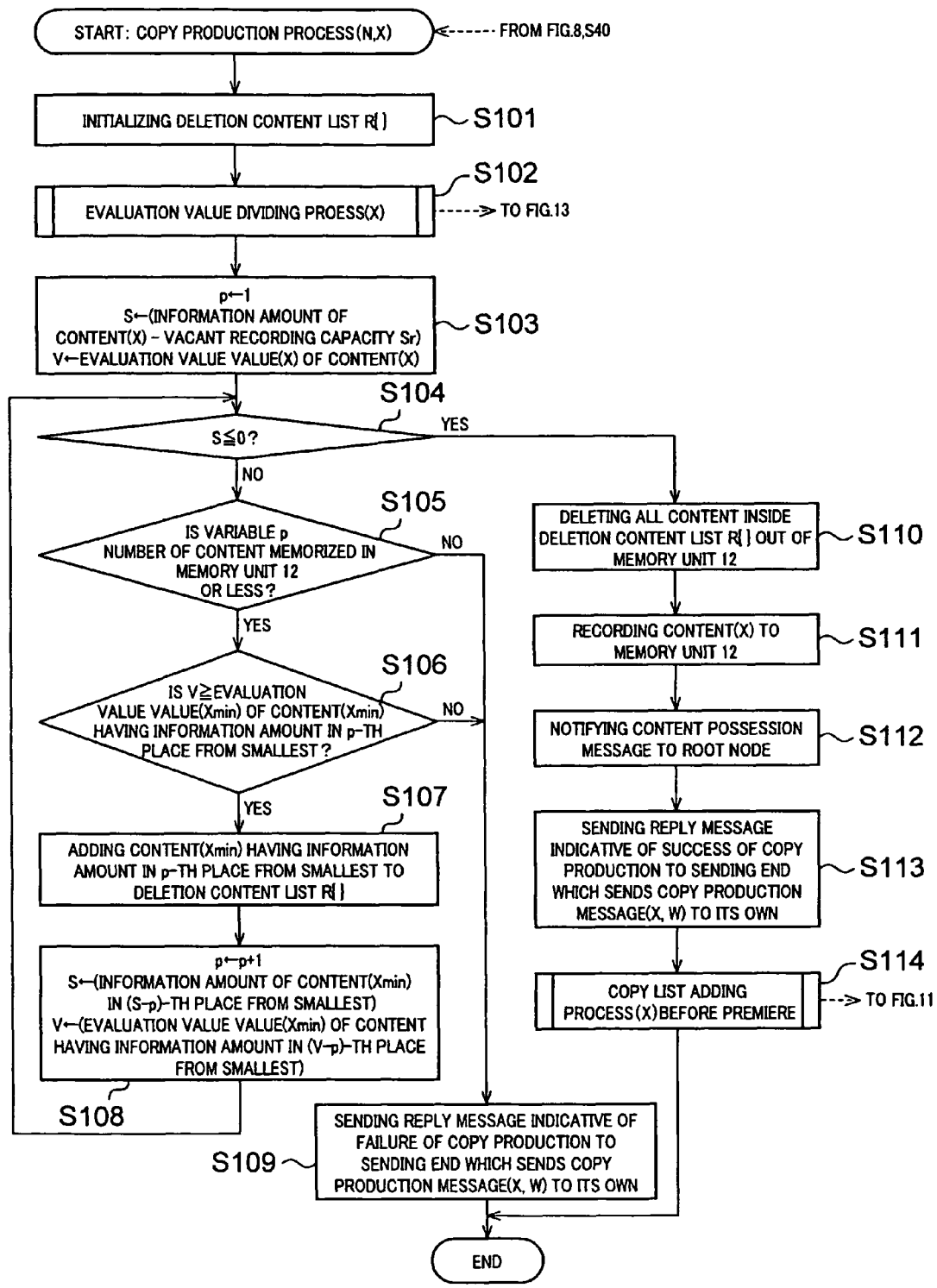
FIG. 15 is a flow chart showing copy production process in a node according to the present embodiment.

Subsequently, "copy production process (N, X)" in Step S40 (vide FIG. 8) of "2. basic process of each node" will be described in use of the flowchart shown in FIG. 15. This process is carried out after receiving a copy production message (X, W) as record instruction information for instructing record of the content (X) from the content registration apparatus 100 or the other nodes N (the above-described Step S33 in FIG. 8).

First, a deletion content list { } is produced in the memory unit 12, and the list is made empty and initialized (Step S101). Subsequently, "evaluation value division process (X)" is carried out (Step S102), the variable p is made one, a value obtained by subtracting a vacant record region Sr being a region where content is not recorded out of a region for memorizing content in the memory unit 12 is made parameter S, and the evaluation value VALUE(X) of the content(X) is defined as parameter V (Step S103). Since the "evaluation value division process (X)" in Step S102 is similar to a process described in reference of FIG. 13 in (2) content sending process (N, X) of the above-described "2-1. copy production process before premiering content", explanation thereof is omitted.

Subsequently, the control unit 11 functions as a capacity judgment means and judges whether or not the parameter S is 0 (zero) or less (Step S104). If it is judged the parameter is not zero or less (Step S104: No), it results in that the vacant record capacity is not information amount of contents (X) or more. Therefore, a process of producing a vacant record capacity Sr is subsequently carried out.

First, it is judged whether or not variable p has number of contents, memorized in the memory unit 12, or less (Step S105). When the variable p is the number of contents memorized in the memory unit 12 or less (Step S105: Yes), the control unit 11 functions as an evaluation value judgment means to thereby judge whether a value of the parameter V is smaller than an evaluation value VALUE (Xmin) of a content (Xmin) having an information amount smaller in the p-th place (variable p) out of the contents memorized in the memory unit 12. Further, when the evaluation value (Xmin) is the value of the parameter V or less (Step S106: Yes), the content having information amount in the p-th position from the smallest is added to a deletion content list R { } (Step S107).

Since the evaluation value VALUE (Xmin) is increased at every access (delivery request), a content having lower evaluation value VALUE is a content having few accesses and most suitable for deletion as unpopular content. As for variation of the evaluation value VALUE by accessing after premiere, since it is described in detail in the above-mentioned patent application (Japanese Patent Application No. 2005-095639), a explanation thereof is omitted.

Subsequently, one is added to the variable p, a value obtained by subtracting an information amount of the content in p-th place from the smallest information amount from the parameter S is made a new parameter S, and a value obtained by subtracting an evaluation value VALUE (X) of content in p-th place from the smallest information amount from the parameter V is made a new parameter V (Step S108). Then the process moves to Step S104.

In the processes of Steps S104 to S108, it is controlled to avoid that the sum of the evaluation values of contents to be deleted (deletion content list R{ }) does not lower than an evaluation value of content instructed to produce copy.

Meanwhile, in Step S105, when the variable p is less than the number of contents memorized in the memory unit 12 (Step S105: No), i.e. a memory capacity of the memory unit 12 is originally small, or amount of the contents (X) instructed to produce copy is tremendous, there are no content which can be deleted in the memory unit 12. Therefore, the content (X) thus received is not recorded, the content of the deletion contents list R{ } is not deleted from the memory unit 12, and a reply message that the copy production fails is sent to the sending end of the copy production message (X, W) (Step S109). Then the process ends.

Further, when it is judged that the value of the parameter V is smaller than the evaluation value VALUE (Xmin) (Step S106: No), the content (X) received in a similar manner is not recorded, and the content in the deletion content list R{ } is not deleted from the memory unit 12, and a reply message showing that the copy production fails is sent to the sending side of the copy production message (X, W) (Step S109). Then the process ends. Accordingly, when an evaluation value (corresponding to the parameter V in this process) of the content (X) to be subjected to record instruction can be constructed so as not to delete the content which is already recorded.

In Step S104, when it is judged that the parameter S is zero (0) or less (Step S104: Yes), the control unit 11 functions as a deletion means, a second common information record means, a second evaluation information memory means and a second premiere time information memory means to thereby delete all contents in the deletion content list R { } (Step S110) and record (memorize) the contents (X) according to record instruction included in the copy production message, the evaluation value VALUE (X) of the content and the parameter W (premiere time information To since it is before premiere) (Step S111).

The control unit 11 functions as a record notification information send means to thereby notify a possession message for notifying the content (X) is newly owned to a root node, as an administration apparatus of the content (X) (Step S112). The root node of the content (X) can be specified by acquiring a hash value by hashing a title or the like of the content (X) and providing DHT routing on the basis of the hash value thus obtained.

Further, a reply message indicative of an event that copy production succeeds is sent to the sending end, which sends the copy production message (X, W) to its own, and "copy list adding process (X) before premiere" is carried out (Step S114). Then, the process ends. Meanwhile, since "copy list adding process (X) before premiere" in Step S114 is similar to the process described in reference of FIG. 11 in (2) copy list adding process before premiere in the above-described "2-1. copy production process of content before premiere", explanation thereof is omitted.

As described above, according to the embodiment, it is possible to make the content previously (before premiere) hold in a large number of nodes before holding so as to be used in common with the other nodes. Therefore, even in a case where a large number of nodes request delivery of the content at once after the premiere, the large number of the nodes can previously hold the content. In comparison with a case where only one node holds the content, it is possible to relatively smoothly distribute the content between each P to P even immediately after the premiere, whereby reliability of an entire system is improved.

Further, it is constructed such that the copy production starting time I, being a time for next copying in each node at every copy by Step S63 in (2) copy list adding process before premiere in the above-mentioned "2-1. copy production of content before premiere", is updated in use of a premiere preparation time E based on the current time and the premiere time information To and the evaluation value VALUE, and such that a timing for starting copy production is changeable. Therefore, it is possible to prevent an adverse effect such as load on an entire system increases (e.g. delay on sending and receiving other messages) caused by starting copy production of the nodes included in a delivery system all at once.

Figure 16:
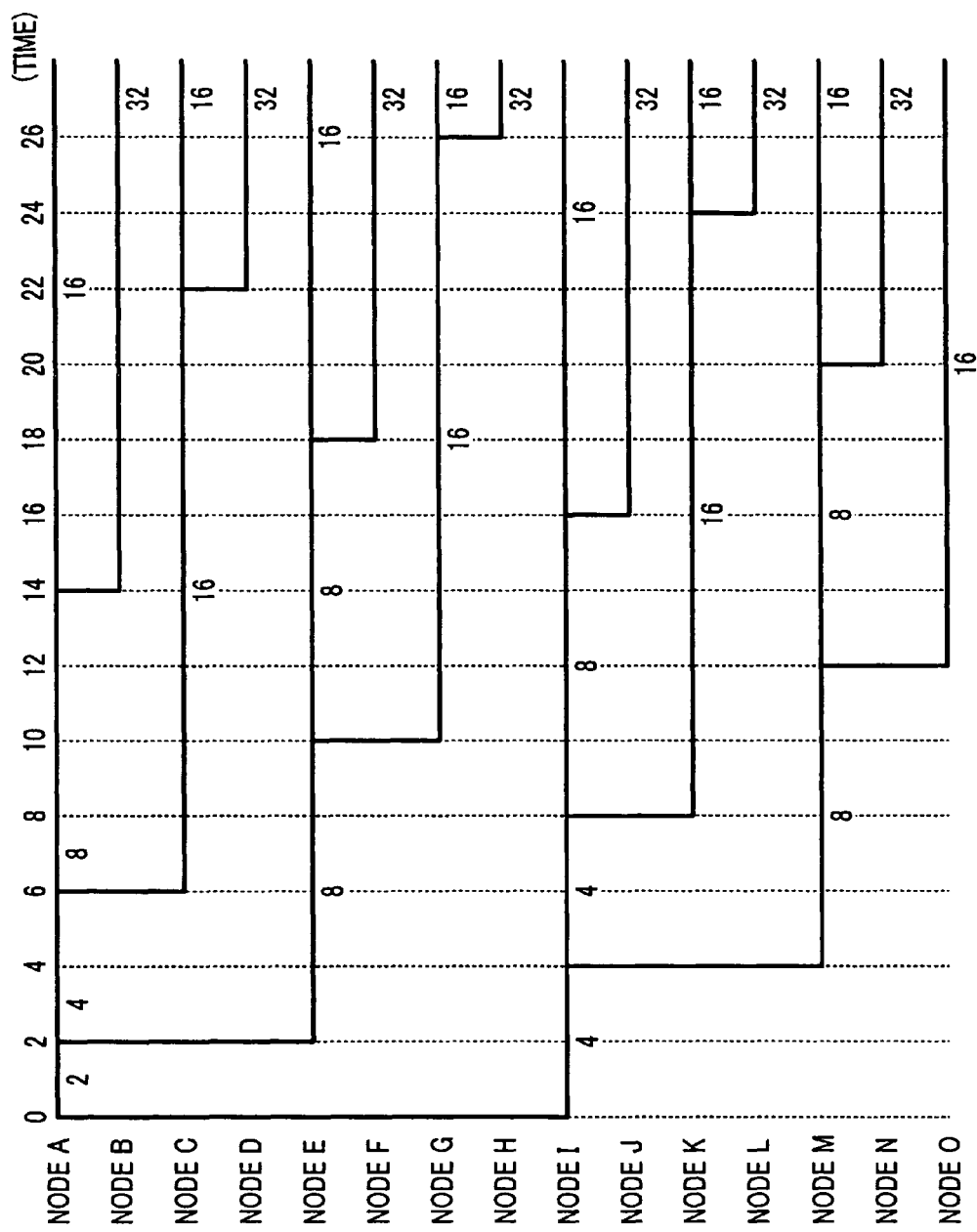
FIG. 16 is a timing chart showing copy production process carried out in nodes A through O according the present embodiment.

FIG. 16 is a timing chart indicative of the copy production process carried out in nodes A to O. In the figure, the ordinate represents the nodes A to O, and the abscissa represents time. This is a case where a copy production message (X, N), which has an evaluation value of 48 and a premiere preparation duration E of 48 hours later, is sent.

In this chart, each value indicates a time after producing a copy and before producing a next copy. The values show that a copy production process is carried out in any node with an interval of two hours.

Namely, the node A first sends and copies a copy production message (X, N) to the node I. After two hours, the node A sends and copies the copy production message (X, N) to the node E, and after two more hours the node I is copied to the node M.

As such, nodes included in the delivery system are prevented from being copied all at once. Therefore, it is possible to previously send a content to be premiered to a plurality of nodes and to scatter inside the system in advance without applying load to the distribution system.

It is possible to prevent other adverse effects (e.g. delay of sending and receiving other messages), caused by carrying out process in all nodes, from occurring by providing service only in a specific node holding the content.

Further, in a case where a vacant recording capacity of the memory unit 12, which receives copy production message (X, W) of contents, is an information amount or more of the contents to be subjected to record instruction, since it is configured to delete node having a low evaluation value VALUE, it is possible to make the contents to be premiered in a large number of nodes and surely scatter the contents before premiere inside the system, whereby preparation of premiere can be arranged.

(3. Other Embodiments of Node Selection Process in Receiving End)

Subsequently, another embodiment of node selection process on receiving end will be described.

Figure 7:
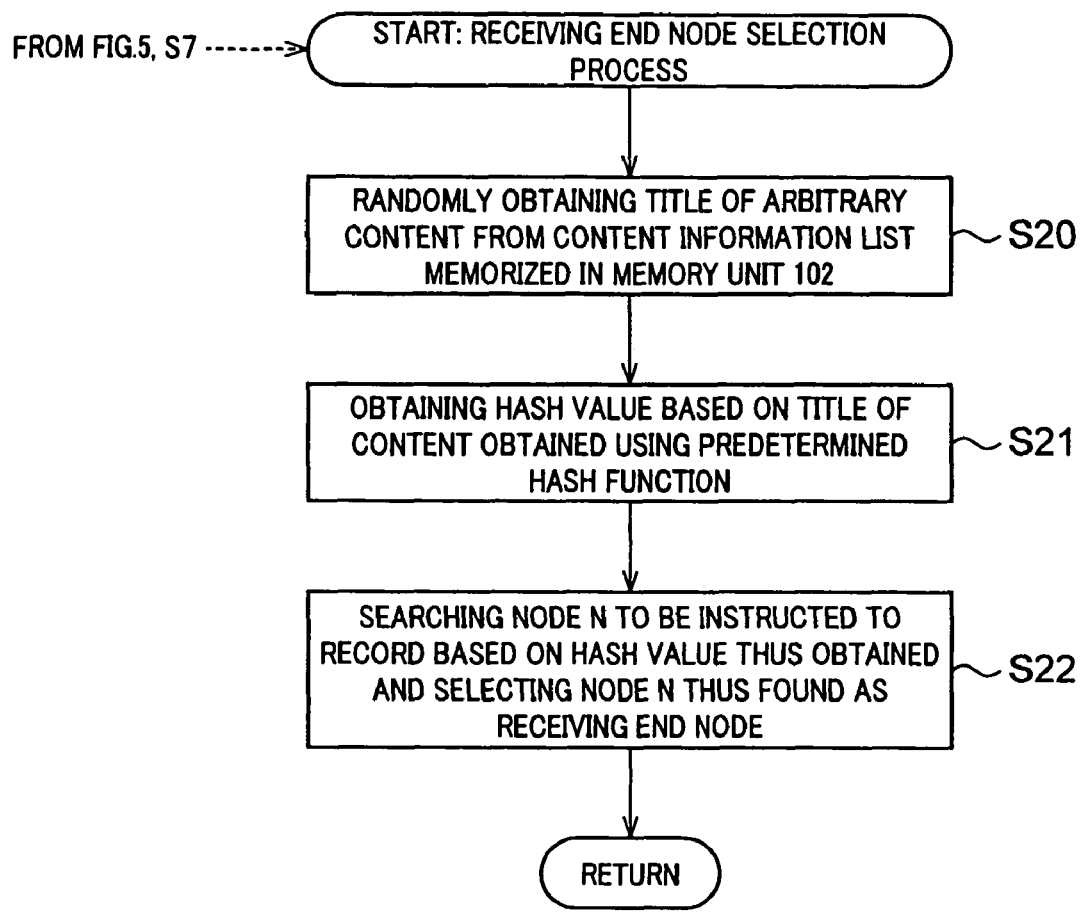
FIG. 7 is a flow chart showing receiving end node selection process in a content registration apparatus 100 and node according to the present embodiment.

In the above-described "receiving end selection process" (Step S7 and Step S55), it is constructed such that a title of arbitrary content is hashed to thereby obtain a hash value, one node N is searched on the basis of the hash value thus obtained, and one node N (for example, root node of the arbitrary node) thus found is selected as a receiving end (vide FIG. 7). However, in this embodiment, it is constructed such that a distance between the nodes is measured in use of hop numbers as a number of intermediary devices on a communication route to a receiving node and the receiving nodes scatter inside the distribution system in order for uniformly distributing and arranging contents inside the distribution system.

At this time, the content registration terminal 100 is configured such that receiving side maximum hop number H is defined as a huge number like million in "1. content registration process of content registration apparatus" in the content registration terminal 100 (for example, it is defined in process of Step S2 in FIG. 5), and the maximum hop number H is included in a copy production message (X, W) and sent to the receiving node, which is first selected. Accordingly, it becomes possible to select the receiving node based on the hop number in each node in Step S55 using the receiving end maximum hop number H which is changed in the process explained next.

Hereinafter, explanation is given in detail in use of the flowchart of FIG. 17.

First, the receiving end maximum hop number H is obtained (Step S130). Subsequently, a process of changing the receiving end maximum hop number to H at a predetermined probability V is carried out, and it is initialized by changing a variable H' to "0" and a variable k to "0" (Step S131). Meanwhile, by changing the receiving end maximum hop number to H at a predetermined probability V to thereby set a probability V to, for example, 0.1, in a case where the receiving end node selection processes is carried out ten times, a once among these is returned to a huge value like million, which is defined first by a content registration terminal 100 in Step S2.

Subsequently, it is judged whether or not the variable k is smaller than ten (Step S132). When it is smaller than ten (Step S132: Yes), a title of arbitrary content is randomly acquired out of the content information list, memorized in the memory unit 102 (Step S133). Meanwhile, when the process is carried out by a node, it is constructed such that a title or the like of content is obtained from the content list after premiere (not shown) which is memorized in the memory unit 12 and already premiered, the content list before premiere shown in FIG. 10 or the like.

Subsequently, on the basis of the title of content obtained in use of the predetermined hash function, a hash value is obtained (Step S134). Processes in Steps S133 and S134 are similar to Steps S20 and S21 described above.

Then on the basis of the hash value thus acquired, a hop number h to the node Nc (content holder), which holds the content obtained in Step S132, is obtained (Step S135). Meanwhile, the hop number h can be obtained by communicating with the node Nc and referring to decrement of a TTL field inside an IP packet.

Then, it is judged whether or not the hop number h is the variable H or less and larger than the variable H' (Step S136). In a case where the hope number h is the receiving end maximum hop number H or less and larger than the variable H' (Step S136: Yes), the hop number is made H', and one is added to k (Step S138) after selecting the node Nc as the receiving node (Step S137). Then the process moves to Step S132.

On the other hand, in a case where the hop number h is less that the receiving end maximum hop number H or in a case where the hop number h is the variable number H' or less (Step S135: No), one is added to k (Step S138). Then the process moves to step S132.

In a case where the variable k is ten or more in Step S132 (Step S132: No), a minimum natural number exceeding a value obtained by halving the variable H' is obtained as a new variable H' (Step S139), and the variable H' is entered into the receiving end maximum hop number H. Then the process ends (Step S140).

Since it is possible to select the node n (hop number h) to be sent on the basis of the receiving end maximum hop number H, it is possible to uniformly scatter and arrange inside a system before premiere.

When the process is carried out in the node, the control unit 11 functions as a designation means for designating number of intermediary devices on a communication path of a receiving end node, which is selected as the control unit 11 by itself. Furthermore, repeating this among each of the nodes results in random designation of hop number (number of intermediary devices).

Further, in the above embodiment, although the content registration apparatus 100 is configured to register new contents (FIG. 5), it is possible to carry out a registration process of registering contents (e.g. a case where DVD or the like is loaded into a node and content data are taken in) possessed by each node as a new content so as to be used in common with the nodes inside the system. In this case, it can be configured to inform the content registration apparatus 100 of an event that the new content are thrown into the system.

As respectively described, the present invention can be used in a field of content delivery through a network, and a prominent effect is obtainable by applying to a field of distributing and arranging contents before premiere, which should be owned in common with a plurality of nodes, to each of the nodes.

The present invention is not confined to the configuration listed in the foregoing embodiments, but it is easily understood that the person skilled in the art can modify such configurations into various other modes, within the scope of the present invention described in the claims.

What is claimed is:

1. An information delivery system having a plurality of information processing apparatuses which can mutually communicate through a network and a registration apparatus which holds at least one or more common information to be used in common with the plurality of information processing apparatuses, wherein the registration apparatus comprising:
a first common information record unit that records at least one or more common information;
a first release time information memory unit that memorizes release time information with respect to each of the common information, the release time information indicating a time when the common information, recorded in the first common information record unit, can be used by the plurality of information processing apparatuses through the network and can be used in common;
a first apparatus selection unit that selects a predetermined information processing apparatus from the plurality of information processing apparatuses;

a first record instruction information send unit that sends a first record instruction information indicating an instruction which instructs the information processing apparatus selected by the first apparatus selection unit to record a predetermined common information out of the common information recorded in the first common information record unit;

a first common information transmission unit that transmits the common information, a recording of which is instructed by the first record instruction information, to the information processing apparatus, which is selected by the first apparatus selection unit;

a first release time information send unit that sends the release time information corresponding to the common information, a recording of which is instructed by the first record instruction information, to the information processing apparatus selected by the first apparatus selection unit;

wherein the information processing apparatuses comprising:

an information receiving unit that receives the first record instruction information sent by the first record instruction information send unit, the common information transmitted by the first common information transmission unit, and the release time information sent by the first release time information send unit;

a second common information record unit that records the common information received by the information receiving unit;

a second release time information memory unit that memorizes the release time information, received by the information receiving unit, in association with the common information corresponding to the release time information;

a second apparatus selection unit that selects an information processing apparatus out of the plurality of information processing apparatuses for instructing recording of the common information indicated by the first record instruction information received by the information receiving unit out of the common information recorded in the second common information record unit;

a first determination unit that determines whether or not a release time indicated by the release time information received by the information receiving unit is after a current time;

a second record instruction information send unit that sends a second record instruction information indicating an instruction which instructs the information processing apparatus selected by the second apparatus selection unit to record the common information indicated by the first record instruction information received by the information receiving unit when it is determined that the release time indicated by the release time information is not after the current time by the first determination unit;

a second common information transmission unit that transmits the common information, a recording of which is instructed by the second record instruction information, to the information processing apparatus selected by the second apparatus selection unit; and a second release time information send unit that sends the release time information corresponding to the common information transmitted by the second common information transmission unit to the information processing apparatus selected by the second apparatus selection unit.

2. The information delivery system according to claim 1, wherein the registration apparatus further comprises a first evaluation information memory unit that memorizes evaluation information respectively in association with the common information, the evaluation information indicating prediction of frequency of access to the common information; and a first evaluation information send unit that sends the evaluation information corresponding to the common information indicated by the record instruction information to the information processing apparatus selected by the first apparatus selection unit;

wherein the information receiving unit in the information processing apparatuses receives the evaluation information;

the information processing apparatuses further comprise;

a second evaluation information memory unit that memorizes evaluation information received by the information receiving unit in association with the common information corresponding to the evaluation information;

a setting unit that sets a time interval from a time when the first record instruction information is received by the information receiving unit to a time when the second record instruction information is sent so that the time interval is shortened in proportion as the frequency of access indicated by the evaluation information memorized in the second evaluation information memory unit increases; and a second determination unit that determines whether or not the time interval set by the setting unit elapses;

wherein the second record instruction send unit sends the second record instruction information which instructs the information processing apparatus selected by the second apparatus selection unit to record the common information transmitted by the second common information transmission unit when it is determined that the release time is not after the current time by the first determination unit and it is determined that the time interval elapses by the second determination unit.

3. A registration apparatus in an information delivery system having a plurality of information processing apparatuses which can mutually communicate through a network and the registration apparatus which holds at least one or more common information to be used in common with the plurality of information processing apparatuses, comprising:

a first common information record unit that records at least one or more common information;

a first release time information memory unit that memorizes release time information with respect to each of the common information, the release time information indicating a time when the common information, recorded in the first common information record units, can be used by the plurality of information processing apparatus through the network and can be used in common;

a first apparatus selection unit that selects a predetermined information processing apparatus from the plurality of information processing apparatuses;

a first record instruction information send unit that sends a first record instruction information indicating an instruction which instructs the information processing apparatus selected by the first apparatus selection unit to record a predetermined common information out of the common information recorded in the first common information record unit;

a first common information transmission unit that transmits the common information, a recording of which is instructed by the first record instruction information, to the information processing apparatus, which is selected by the first apparatus selection unit; and a first release time information send unit that sends the release time information corresponding to the common information, a recording of which is instructed by the first record instruction information, to the information processing apparatus selected by the first apparatus selection unit.

4. A non-transitory computer-readable storage medium that stores a computer-executable program for an information delivery system having a plurality of information processing apparatuses which can mutually communicate through a network and a registration apparatus which holds at least one or more common information to be used in common with the plurality of information processing apparatuses, the medium being stored in the registration apparatus, the program comprising instructions for:

recording at least one or more common information;
memorizing release time information with respect to each of the common information, the release time information indicating a time when the common information can be used by the plurality of information processing apparatus through the network and can be used in common;
selecting a predetermined information processing apparatus from the plurality of information processing apparatuses;
sending a first record instruction information indicating an instruction which instructs the selected information processing apparatus to record a predetermined common information out of the common information recorded in the registration apparatus;
transmitting the common information to the selected information processing apparatus; and
sending the release time information corresponding to the common information to the selected information processing apparatus.

5. An information processing apparatus in an information delivery system having a plurality of the information processing apparatuses which can mutually communicate through a network and a registration apparatus which holds at least one or more common information to be used in common with the plurality of information processing apparatuses, comprising:

an information receiving unit that receives a first record instruction information indicating an instruction which instructs the information processing apparatus to record a predetermined common information; the common information, a record of which is instructed by the first record instruction information; and release time information indicating a time when the common information, recorded by the registration apparatus or the information processing apparatuses, can be used by the plurality of information processing apparatuses through the network and can be used in common;
a second common information record unit that records the common information received by the information receiving unit;
a second release time information memory unit that memorizes the release time information, received by the information receiving unit, in association with the common information corresponding to the release time information;
a second apparatus selection unit that selects an information processing apparatus out of the plurality of information processing apparatuses for instructing recording of the common information indicated by the first record instruction information received by the information receiving unit out of the common information recorded in the second common information record unit;
a first determination unit that determines whether or not a release time indicated by the release time information received by the information receiving unit is after a current time;
a second record instruction information send unit that sends a second record instruction information indicating an instruction which instructs the information processing apparatus selected by the second apparatus selection unit to record the common information indicated by the first record instruction information received by the information receiving unit when it is determined that the release time indicated by the release time information is not after the current time by the first determination unit;
a second common information transmission unit that transmits the common information, a recording of which is instructed by the second record instruction information, to the information processing apparatus selected by the second apparatus selection unit; and
a second release time information send unit that sends the release time information corresponding to the common information transmitted by the second common information transmission unit to the information processing apparatus selected by the second apparatus selection unit.

6. The information processing apparatus according to claim 5, further comprising:

a record notification information sending unit that sends an event that a new common information is recorded in the second common information record unit to an administration apparatus which administrates existence of the new common information after the new common information is recorded in the second common information record unit.

7. The information processing apparatus according to claim 5, wherein the second apparatus selection unit includes designation unit that designates a number of intermediary devices in a communication path between the second apparatus selection unit and the information processing apparatus to thereby select the information processing apparatus which has the designated number of the intermediary devices in the communication path among the plurality of information processing apparatuses.

8. The information processing apparatus according to claim 7, wherein the designation unit randomly designates the number of the intermediary devices.

9. The information processing apparatus according to claim 5, further comprising:

a capacity judgment unit that judges whether or not a vacant capacity of the second common information record unit is more than information amount of the common information, received with the information receiving unit;
a deletion common information selection unit that selects the common information having the lowest common evaluation value, indicated by an evaluation information corresponding to the common information received by the information receiving unit, as a deletion common information when it is determined that the vacant capacity is not more than the information amount of the common information received with the information receiving unit by the capacity judgment unit; and a deletion unit that deletes the deletion common information thus selected from the second common information record unit.

10. The information processing apparatus according to claim 9, further comprising:

an evaluation value judgment unit that judges whether or not an evaluation value indicated by the evaluation information corresponding to the common information received with the information receiving unit is smaller than an evaluation value indicated by the evaluation information corresponding to the deletion common information thus selected, wherein if it is judged that the evaluation value indicated by the evaluation information corresponding to the common information, received with the information receiving unit, is smaller than the evaluation value indicated with the evaluation information corresponding to the deletion common information thus selected, the second common information record unit does not record the common information thus received, and the deletion unit does not delete the deletion common information thus selected with the deletion common information selection from the second common information record unit.

11. The information processing apparatus according to claim 5, wherein the information receiving unit in the information processing apparatuses receives evaluation information respectively in association with the common information, the evaluation information indicating prediction of frequency of access to the common information;

wherein the information processing apparatuses further comprise:

a second evaluation information memory unit that memorizes evaluation information received by the information receiving unit in association with the common information corresponding to the evaluation information;

a setting unit that sets a time interval from a time when the first record instruction information is received by the information receiving unit to a time when the second record instruction information is sent so that the time interval is shortened in proportion as the frequency of access indicated by the evaluation information memorized in the second evaluation information memory unit increases; and a second determination unit that determines whether or not the time interval set by the setting unit elapses;

wherein the second record instruction send unit sends the second record instruction information which instructs the information processing apparatus selected by the second apparatus selection unit to record the common information transmitted by the second common information transmission unit when it is determined that the release time is not after the current time by the first determination unit and it is determined that the time interval elapses by the second determination unit.

12. The information processing apparatus according to claim 11, an update unit that updates the evaluation information corresponding to the second record instruction information so that a value indicated by the evaluation information becomes low;

a second evaluation information send unit that sends the evaluation information updated by the update unit to the information processing apparatus selected by the second apparatus selection unit.

13. A non-transitory computer-readable storage medium that stores a computer-executable program for an information processing apparatus in an information delivery system having a plurality of information processing apparatuses which can mutually communicate through a network and a registration apparatus which holds at least one or more common information to be used in common with the plurality of information processing apparatuses, the medium being stored in the registration apparatus, the program comprising instructions for:

receiving the first record instruction information indicating an instruction which instructs the information processing apparatus to record a predetermined common information and release time information indicating a time when the common information, recorded by the registration apparatus or the information processing apparatuses, can be used by the plurality of information processing apparatuses through the network and can be used in common;

recording the received common information;

memorizing the received release time information in association with the common information corresponding to the release time information;

selecting an information processing apparatus out of the plurality of information processing apparatuses for instructing recording of the common information indicated by the received first record instruction information out of the recorded common information;

determining whether or not a release time indicated by the received release time information is after a current time;

sending a second record instruction information indicating an instruction which instructs the selected information processing apparatus to record the common information indicated by the received first record instruction information when it is determined that the release time indicated by the release time information is not after the current time;

transmitting the common information, a recording of which is instructed by the second record instruction information, to the selected information processing apparatus; and sending the release time information corresponding to the transmitted common information to the selected information processing apparatus.

* * * * *